(12) United States Patent
Li et al.

(10) Patent No.: US 9,899,002 B2
(45) Date of Patent: Feb. 20, 2018

(54) INFORMATION PROCESSING METHODS FOR DISPLAYING PARTS OF AN OBJECT ON MULTIPLE ELECTRONIC DEVICES

(71) Applicant: LENOVO (BEIJING) LIMITED, Beijing (CN)

(72) Inventors: Fanzhi Li, Beijing (CN); Gang Bai, Beijing (CN); Jianjun Pang, Beijing (CN); Hao Liu, Beijing (CN); Qiang Guo, Beijing (CN); Mingxu Mao, Beijing (CN)

(73) Assignee: Lenovo (Bejing) Limited, Beijing (CN)

(*) Notice: Subject to any disclaimer, the term of this patent is extended or adjusted under 35 U.S.C. 154(b) by 426 days.

(21) Appl. No.: 14/228,487

(22) Filed: Mar. 28, 2014

(65) Prior Publication Data
US 2015/0091917 A1 Apr. 2, 2015
US 2017/0301312 A9 Oct. 19, 2017

(30) Foreign Application Priority Data

Sep. 27, 2013 (CN) .............................. 2013 1 041175
Sep. 27, 2013 (CN) .......................... 2013 1 0452209
Sep. 27, 2013 (CN) .......................... 2013 1 0452985
Sep. 27, 2013 (CN) .......................... 2013 1 0453028
Sep. 27, 2013 (CN) .......................... 2013 1 0459736

(51) Int. Cl.
*G09G 5/12* (2006.01)
*G09G 5/02* (2006.01)
*G06F 3/14* (2006.01)

(52) U.S. Cl.
CPC ............. *G09G 5/12* (2013.01); *G06F 3/1446* (2013.01); *G09G 5/026* (2013.01)

(58) Field of Classification Search
None
See application file for complete search history.

(56) References Cited

U.S. PATENT DOCUMENTS 5,956,046 A * 9/1999 Kehlet .................. G06F 3/1438
345/1.3
7,136,042 B2 * 11/2006 Magendanz .......... G06F 3/1431
345/1.1

(Continued)

Primary Examiner — Maurice L McDowell, Jr.
Assistant Examiner — Donna J Ricks
(74) Attorney, Agent, or Firm — Kinney & Lange, P.A.

(57) ABSTRACT

The present disclosure discloses an information processing method and an electronic device, solving the technical problem that it needs to write additional special codes to enable executing an application program in two or more electronic devices simultaneously and enable displaying output content collectively on two or more display units. The method includes: acquiring data of a first part of a first object needed to be displayed on the first display unit, wherein, data of a second part in the first object different from the data of the first part is determined to be displayed on a second display unit; synchronizing, by the first electronic device, with the second electronic device; and displaying the data of the first part on the first display unit by the first electronic device synchronously executing a first application program corresponding to the first object while displaying the data of the second part on the second display unit by the second electronic device executing the first application program.

23 Claims, 7 Drawing Sheets

(56) References Cited

U.S. PATENT DOCUMENTS

| | | | | |
|---|---|---|---|---|
| 9,036,084 B2* | 5/2015 | Law | ................ | H04N 5/04 |
| | | | | 348/500 |
| 9,075,561 B2* | 7/2015 | Sarnoff | ................ | G06T 1/20 |
| 9,207,902 B2* | 12/2015 | Kim | ................ | G06F 3/1423 |
| 2014/0316543 A1* | 10/2014 | Sharma | ................ | G06F 3/1446 |
| | | | | 700/94 |

* cited by examiner

INFORMATION PROCESSING METHODS FOR DISPLAYING PARTS OF AN OBJECT ON MULTIPLE ELECTRONIC DEVICES

TECHNICAL FIELD

The present disclosure relates to the field of electronic technologies, and more particularly, to information processing methods and electronic devices.

BACKGROUND

With the rapid development of the electronic age, a growing number of electronic devices are introduced to people's lives and works, bringing great convenience to people.

Users often execute multiple application programs in one electronic device simultaneously, and thus can make switches and calls between the multiple programs, enhancing the operation efficiency of the electronic devices. Relative to enabling multiple programs to be executed in one electronic device, enabling one program to be executed in multiple electronic devices relates to a more complex technology, and provides a new application scenario at the same time. For example, two display screens of two tablet computers are spliced into one display screen by using a slicing technology for the two tablet computers. Since the display screen becomes larger, a better visual effect can be achieved by a user when browsing a webpage or viewing a video on this display screen.

In order to splice the two electronic devices together for display of output content of an application program, a user needs to adjust display screens of the two electronic devices manually, so as to achieve displaying a display object collectively on the two display screens when they are placed together. For example, when it needs to display an image collectively on the two electronic devices, assuming that the first electronic device is placed on the left side of the second electronic device, a user needs to adjust display content of the first electronic device and the second electronic device, so as to enable the first electronic device to display a left half of the image and the second electronic device to display a right half of the image, achieving displaying the complete image collectively on the two electronic devices.

In order to enable multiple electronic devices to adjust the display content automatically, so as to achieve executing the same program in the multiple electronic devices, another scheme is provided, including: driving the same application program without high requirements on time synchronization to be executed in multiple electronic devices simultaneously by writing related codes. For example, two code programs are written firstly on two electronic devices needing to execute the same application program, and when it needs to execute the application program in the two electronic devices simultaneously, the two code programs are executed, so as to achieve executing the same application program in the two electronic devices simultaneously.

However, the inventors of the present application found at least the following technical problems with the above technology in the process of implementing the inventive technical solutions of the embodiments of the present application.

It needs to previously write related codes on multiple electronic devices so as to achieve executing one program in the multiple electronic devices simultaneously by writing special codes. If there is no code capable of supporting executing one application program simultaneously in one or more of the electronic devices, the one or more electronic devices cannot execute the application program at the same time when the other electronic devices execute the application program. That is, there is a technical problem that it needs to write additional special codes to enable executing an application program in two or more electronic devices simultaneously, so as to enable displaying output content of the program during the runtime collectively on two or more display units.

SUMMARY

With information processing methods and electronic devices of the present application, it solves the technical problem that it needs to write additional special codes to enable executing an application program in two or more electronic devices simultaneously, so as to enable displaying output content of the program during the runtime collectively on two or more display units, and achieves the technical effect of executing the same program in multiple electronic devices and displaying the output content of the program during the runtime collectively on multiple display units of the multiple electronic devices without writing additional special codes.

In one aspect, the present disclosure provides an information processing method applied in a first electronic device, the first electronic device including a first display unit and being capable of communicating with a second electronic device including a second display unit, the method including: acquiring data of a first part of a first object needed to be displayed on the first display unit, wherein, data of a second part in the first object different from the data of the first part is determined to be displayed on the second display unit; synchronizing, by the first electronic device, with the second electronic device; and displaying the data of the first part on the first display unit by the first electronic device synchronously executing a first application program corresponding to the first object while displaying the data of the second part on the second display unit by the second electronic device executing the first application program.

Alternatively, the first electronic device establishes a communication connection with the second electronic device; the first electronic device negotiates with the second electronic device, to determine the data of the first part to be displayed on the first display unit; Alternatively, said acquiring data of a first part of a first object needed to be displayed on the first display unit further includes: receiving to acquire the data of the first part needed to be displayed on the first display unit which is determined by a third electronic device; wherein, the third electronic device is different from both the first electronic device and the second electronic device, and is further configured to determine the data of the second part needed to be displayed on the second display unit.

Alternatively, said synchronizing, by the first electronic device, with the second electronic device further includes: establishing a communication connection between the first electronic device and the second electronic device; and synchronizing the first electronic device with the second electronic device through a first timeline module in the first electronic device and a second timeline module in the second electronic device.

Alternatively, said displaying the data of the first part on the first display unit by the first electronic device synchronously executing the first application program further includes: receiving, by a first graphics processor in the first electronic device, the data of the first part from a central processing unit in the first electronic device when the first application program is running; processing, by the graphics processor, the data of the first part to acquire first output content; storing the first output content in a first display memory of the first electronic device; and performing, by a first random read-write storage digital-to-analog converter in the first electronic device, digital-to-analog conversion on the first output content to acquire first analog content corresponding to the first output content, and transmitting the first analog content to the first display unit for display.

Alternatively, when the whole display area corresponding to the first display unit can only display the data of the first part in the first object, the data of the second part is data not capable of being displayed on the first display unit in the first object except for the data of the first part; or when the whole display area corresponding to the first display unit can completely display the first object, the data of the second part is display data corresponding to a second display area in the whole display area when the first object is completely displayed on the first display unit.

Alternatively, the first application program is an application program with a corresponding time synchronization value representing the degree of time synchronization being smaller than a preset synchronization value.

In another aspect, the present disclosure provides a first electronic device including a first display unit, the first electronic device further including: a first acquisition unit configured to acquire data of a first part of a first object needed to be displayed on the first display unit, wherein, data of a second part in the first object different from the data of the first part is determined to be displayed on the second display unit; a first synchronization unit configured to synchronize the first electronic device with the second electronic device; and a first execution unit configured to display the data of the first part on the first display unit by the first electronic device synchronously executing the first application program corresponding to the first object while displaying the data of the second part on the second display unit by the second electronic device executing the first application program.

Alternatively, the first acquisition unit further includes: a first establishment module configured to establish a communication connection between the first electronic device and the second electronic device; and a first negotiation module configured to enable the first electronic device to negotiate with the second electronic device, so as to determine the data of the first part to be displayed on the first display unit.

Alternatively, the first acquisition unit further includes: a first reception unit configured to receive to acquire the data of the first part needed to be displayed on the first display unit which is determined by the third electronic device; wherein, the third electronic device is different from both the first electronic device and the second electronic device, and is further configured to determine the data of the second part needed to be displayed on the second display unit.

Alternatively, the first synchronization unit further includes: a second establishment module configured to establish a communication channel between the first electronic device and the second electronic device; and a first synchronization module configured to synchronize the first electronic device with the second electronic device through a first timeline module in the first electronic device and a second timeline module in the second electronic device.

Alternatively, when the whole display area corresponding to the first display unit can only display the data of the first part in the first object, the data of the second part is data not capable of being displayed on the first display unit in the first object except for the data of the first part; or when the whole display area corresponding to the first display unit can completely display the first object, the data of the second part is display data corresponding to a second display area in the whole display area when the first object is completely displayed on the first display unit.

Alternatively, the first application program is an application program with a corresponding time synchronization value representing the degree of time synchronization being smaller than a preset synchronization value.

One or more of the above technical solutions according to the embodiments of the present application at least include the following technical effects.

1. In the technical solutions of the present application, the data of the first part of the first object needed to be displayed on the first display unit and the data of the second part needed to be displayed on the second display unit are acquired through negotiation between the two electronic devices, and the first electronic device is synchronized with the second electronic device, so as to ensure that the data of the first part and the data of the second part can be synchronously displayed on the first display unit and the second display unit. Further, the first application program corresponding to the first object is executed in the first electronic device execute and the data of the first part is displayed on the first display unit while the first application program is executed in the second electronic device and the data of the second part is displayed on the second display unit. This solves the technical problem that it needs to write additional special codes to enable executing an application program in two or more electronic devices simultaneously, so as to enable displaying output content of the program during the runtime collectively on two or more display units, and achieves the technical effect that two electronic devices can automatically display different parts of the display interface of the first application program during the runtime according to a negotiation result when they are placed together, so as to achieve displaying the output content of the first application program during the runtime on two display units without writing additional special codes.

2. In the technical solutions of the present application, the data of the first part of the first object needed to be displayed on the first display unit and the data of the second part needed to be displayed on the second display unit are acquired by the first electronic device or the third electronic device. Therefore, this avoids the cases that when the output content of the first application program during the runtime is collectively displayed, the output content may be displayed repeatedly or missed or the display content of two display units cannot be spliced into a complete image, and thus ensures the technical effect of completely displaying the output content of the first application program during the runtime without any repetition, and provides better user experience.

3. In the technical solutions of the present application, a communication connection is established between the first electronic device and the second electronic device, and the first electronic device is synchronized with the second electronic device through the first timeline module in the first electronic device and the second timeline module in the second electronic device. This achieves the technical effect of enabling the first electronic device and the second electronic device to execute the first application program synchronously and enabling the first display unit and the second display unit to display the output content of the first application program during the runtime synchronously.

4. The technical solutions of the present application can effectively solve the above technical problems and achieve corresponding technical effects. Therefore, a user can use two or more electronic devices to execute the same program synchronously and view the output content of the program during the runtime on two or more display units, largely enhancing user experience.

DETAILED DESCRIPTION OF THE PREFERRED EMBODIMENTS

Figure 1:
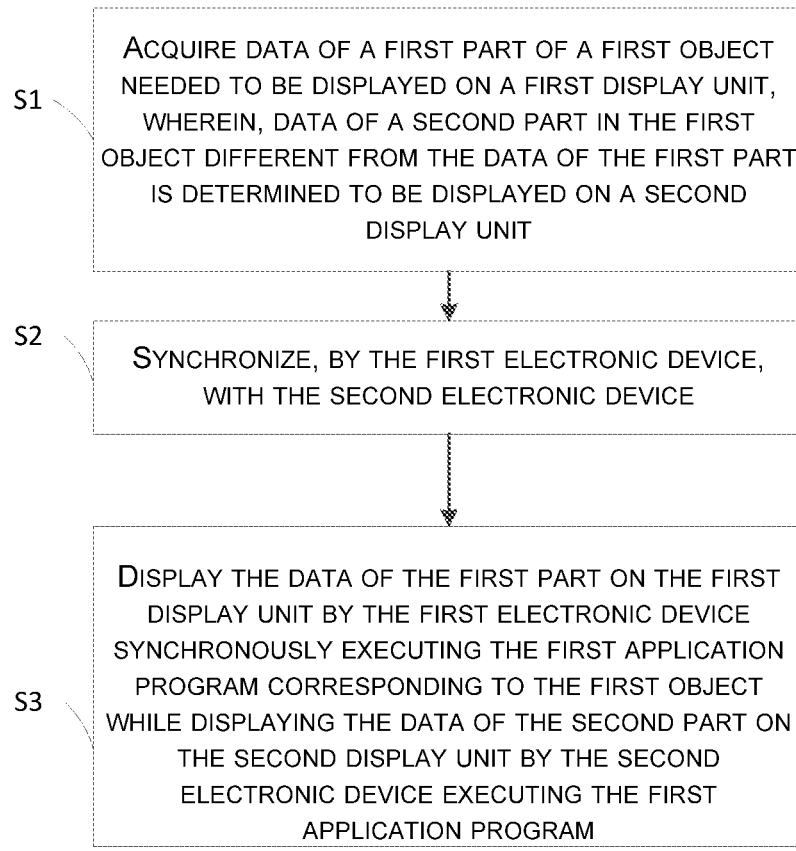
FIG. 1 is a schematic flowchart of an information processing method according to an embodiment of the present application.

With information processing methods and electronic devices of the present application, it solves the technical problem that it needs to write additional special codes to enable executing an application program in two or more electronic devices simultaneously, so as to enable displaying output content of the program during the runtime collectively on two or more display units, and achieves the technical effect of executing the same program in multiple electronic devices and displaying the output content of the program during the runtime collectively on multiple display units of the multiple electronic devices without writing additional special codes.

In order to solve the above technical problem, the general concept of the technical solutions according to the embodiments of the present application is as follows:

acquiring data of a first part of a first object needed to be displayed on the first display unit, wherein, data of a second part in the first object different from the data of the first part is determined to be displayed on a second display unit; synchronizing, by the first electronic device, with the second electronic device; and displaying the data of the first part on the first display unit by the first electronic device synchronously executing a first application program corresponding to the first object while displaying the data of the second part on the second display unit by the second electronic device executing the first application program. Thus, the data of the first part of the first object needed to be displayed on the first display unit and the data of the second part needed to be displayed on the second display unit are acquired through negotiation between the two electronic devices, and the first electronic device is synchronized with the second electronic device, so as to ensure that the data of the first part and data of the second part can be synchronously displayed on the first display unit and the second display unit. Further, the first application program corresponding to the first object is executed in the first electronic device and the data of the first part is displayed on the first display unit while the first application program is executed in the second electronic device and the data of the second part is displayed on the second display unit. This solves the technical problem that it needs to write additional special codes to enable executing an application program in two or more electronic devices simultaneously, so as to enable displaying output content of the program during the runtime collectively on two or more display units, and achieves the technical effect of executing the same program in multiple electronic devices and displaying the output content of the program during the runtime collectively on multiple display units of the multiple electronic devices without writing additional special codes.

The technical solutions of the present disclosure will be described in detail below in conjunction with accompanying drawings and specific embodiments. It should be understood that, the embodiments of the present application and the specific features in the embodiments are indented to specifically describe the technical solutions of the application, instead of limiting the technical solutions of the application. The embodiments of the present application and the technical features in the embodiments can be combined with each other without conflict.

The embodiments of the present application provide information processing methods and electronic devices. In a specific implementation, each of the electronic devices may be a smart phone with a display unit, a tablet computer or a notebook computer, which is not limited by the embodiments of the present application. Further, in a specific implementation, two electronic devices may cooperate to display output content of a first application program during the runtime, or four electronic devices may be placed together for example in a "田" shape to display the output content. A specific number of the electronic devices also is not limited in the present application. The information processing methods and electronic devices according to the embodiments of the present application will be described in detail below by taking cooperation between two tablet computers for display as an example.

The implementation of an information processing method according to an embodiment of the present application will be described in detail below with reference to FIG. 1.

Figure 3:
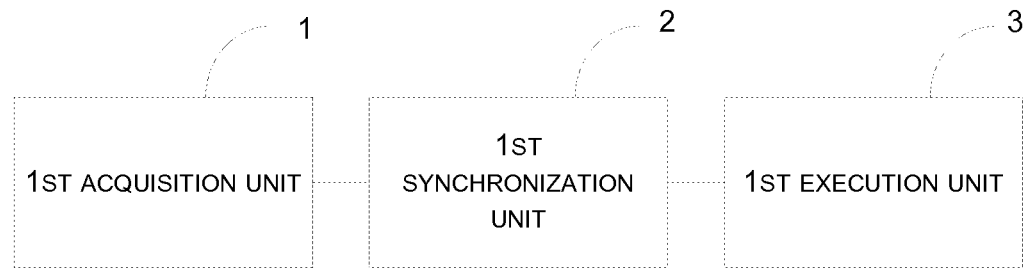
FIG. 3 is a structure schematic diagram of a first electronic device according to an embodiment of the present application.

Before the information processing method according to the embodiment of the present application is described, a basic structure of a first electronic device in which the method according to the embodiment of the present disclosure is applied will be firstly described. With reference to FIG. 3, the first electronic device according to the embodiment of the present application includes: a first acquisition unit 1 configured to acquire data of a first part of a first object needed to be displayed on a first display unit, wherein, data of a second part in the first object different from the data of the first part is determined to be displayed on a second display unit; a first synchronization unit 2 configured to synchronize the first electronic device with the second electronic device; a first execution unit 3 configured to display the data of the first part on the first display unit by the first electronic device synchronously executing the first application program corresponding to the first object while displaying the data of the second part on the second display unit by the second electronic device executing the first application program.

Further, a basic structure of the second electronic device according to the embodiment of the present application is similar to that of the first electronic device, and detailed description will be omitted here.

Specifically, the method includes: Step S1: determining data of a first part of a first object needed to be displayed on a first display unit, wherein, data of a second part in the first object different from the data of the first part is determined to be displayed on a second display unit; Step S2: synchronizing, by the first electronic device, with the second electronic device; Step S3: displaying the data of the first part on the first display unit by the first electronic device synchronously executing the first application program corresponding to the first object while displaying the data of the second part on the second display unit by the second electronic device executing the first application program.

In the embodiment of the present application, before the first application program, such as a picture view program or a webpage browser, is executed in the two electronic devices, and output content of the first application program during the runtime is displayed collectively on the two electronic devices, in order to ensure that the display content of the two display units can be spliced into a complete display interface corresponding to the output content, the two electronic devices need to firstly negotiate to determine the content needed to be displayed on the first display unit and second display unit. In the embodiment of the present application, this is implemented by step S1.

Specifically, in the embodiment of the present application, step S1 of acquiring data of a first part of a first object needed to be displayed on a first display unit and data of a second part of a first object needed to be displayed on a second display unit in the method according to the embodiment of the present application can be implemented in two schemes.

The first scheme is that the two electronic devices negotiate to determine the content needed to be displayed on the first display unit and the second display unit respectively.

The second scheme is that the content needed to be displayed on the first display unit and the second display unit respectively is determined by a third electronic device.

Firstly, the first scheme will be described.

Specifically, in the embodiment of the present application, the two electronic devices negotiate to determine the content needed to be displayed on the first display unit and the second display unit respectively further includes the following steps.

1) the first electronic device establishing a communication connection with the second electronic device.

Specifically, in the embodiment of the present application, before the first electronic device and the second electronic device need to execute the first application program collectively, for example, before a picture view program or a webpage browser is opened, the first electronic device firstly establishes a communication connection with the second electronic device, so as to implement the subsequent negotiation process. In a specific implementation, the communication connection between the first electronic device and the second electronic device may be implemented via a data line, so as to implement communication between the first electronic device and the second electronic device. Further, in order to facilitate a user in implementing the communication connection between the two electronic devices, the communication connection between the first electronic device and the second electronic device may also be implemented via a wireless WIFI network, Bluetooth, or infrared. The specific manner of communication connection may be set by those skilled in the art according to practical requirements, and is not limited in the present application.

2) negotiating, by the first electronic device, with the second electronic device, to determine the data of the first part to be displayed on the first display unit.

Specifically, in the embodiment of the present application, after a communication connection is established between the first electronic device and the second electronic device, the first electronic device negotiates with the second electronic device to determine the content needed to be displayed on the first display unit and the second display unit respectively. The specific steps are as follows.

First step: acquiring a position of the first electronic device relative to the second electronic device.

Specifically, if the position of the first electronic device relative to the second electronic device is different, the display content on the first display unit and the second display unit will also be different. Therefore, it needs to firstly acquire the position of the first electronic device relative to the second electronic device. For example, when the first electronic device is placed on the left side of the second electronic device, the first display unit needs to display a left half of a first object, and the second electronic device needs to display a right half of the first object; and when the first electronic device is placed on the lower side of the second electronic device, the first display unit needs to display a lower half of the first object, and the second electronic device needs to display an upper half of the first object. In a specific implementation of acquiring the position of the first electronic device relative to the second electronic device, cameras arranged on or connected to the first electronic device and the second electronic device may be used to capture the two electronic devices, so as to determine the position of the first electronic device relative to the second electronic device. For example, when a captured image shows that the first electronic device is placed on the left side of the second electronic device, it may be determined that the position of the first electronic device is on the left side of the second electronic device.

Second step: determining data of the first part to be displayed on the first display unit and data of the second part to be displayed on the second display unit according to the position of the first electronic device relative to the second electronic device.

Figure 2:
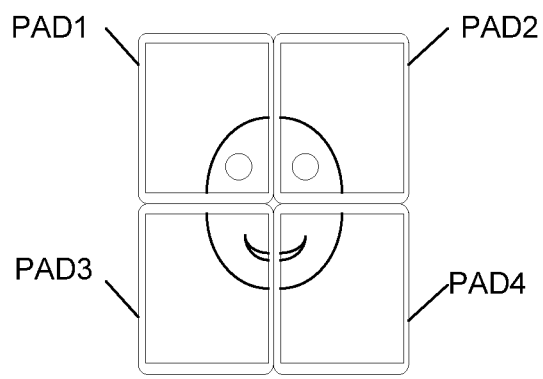
FIG. 2 is a schematic diagram of a display manner according to an embodiment of the present application.

Specifically, in the embodiment of the present application, after the position of the first electronic device relative to the second electronic device is determined, it needs to further determine the content needed to be displayed on the first display unit and the second display unit. For example, if a picture is to be displayed collectively on two tablet computers with the same parameters, when it is determined that the first tablet computer is placed on the left side of the second tablet computer, the first electronic device is enabled to display the left half of the picture, and the second tablet computer is enabled to display the right half of the picture. Alternatively, if a picture is to be displayed on four tablet computers with the same parameters and the four tablet computers are placed in a "田" shape, as shown in FIG. 2, the first tablet computer PAD1 is enabled to display an upper left quarter of the picture, the second tablet computer PAD2 is enabled to display an upper right quarter of the picture, the third tablet computer PAD3 is enabled to display a lower left quarter of the picture, and the fourth tablet computer PAD4 is enabled to display a lower right quarter of the picture. Thereby, display content of the four display units can be spliced into a complete display interface corresponding to the original picture.

Next, the second scheme will be described.

Specifically, the first electronic device and the second electronic device negotiating through a third electronic device to determine the content needed to be displayed on the first display unit and the second display unit respectively further includes the following steps.

1) acquiring the data of the first part needed to be displayed on the first display unit which is determined by the third electronic device.

The third electronic device is different from both the first electronic device and the second electronic device. The third electronic device is further configured to determine data of the second part needed to be displayed on the second display unit.

Specifically, in the embodiment of the present application, determining, by a third electronic device, the content needed to be displayed on the first display unit and the second display unit respectively includes the following steps.

First step: acquiring, by the third electronic device, a position of the first electronic device relative to the second electronic device.

Specifically, the first electronic device and the second electronic device establishes communication connections with the third electronic device respectively, for example, a wireless network connection or a Bluetooth connection, and then the third electronic device determines the position of the first electronic device relative to the second electronic device.

Specifically, if the position of the first electronic device relative to the second electronic device is different, the content displayed on the first display unit and the second display unit will also be different. Therefore, it needs to firstly acquire the position of the first electronic device relative to the second electronic device. For example, when the first electronic device is placed on the left side of the second electronic device, the first display unit needs to display a left half of a first object, and the second electronic device needs to display a right half of the first object; and when the first electronic device is placed on the lower side of the second electronic device, the first display unit needs to display a lower half of the first object, and the second electronic device needs to display an upper half of the first object. In a specific implementation of acquiring the position of the first electronic device relative to the second electronic device, a camera arranged on or connected to the third electronic device can be used to capture the two electronic devices, so as to determine the position of the first electronic device relative to the second electronic device. For example, when a captured image shows that the first electronic device is placed on the left side of the second electronic device, it may be determined that the position of the first electronic device is on the left side of the second electronic device.

Second step: determining data of the first part to be displayed on the first display unit and data of the second part to be displayed on the second display unit according to the position of the first electronic device relative to the second electronic device.

Specifically, in the embodiment of the present application, after the position of the first electronic device relative to the second electronic device is determined, it needs to further determine the content needed to be displayed on the first display unit and the second display unit. For example, if a picture is to be displayed collectively on two tablet computers with the same parameters, when it is determined that the first tablet computer is placed on the left side of the second tablet computer, the third electronic device transmits a first instruction to the first tablet computer to enable the first electronic device to display the left half of the picture, and simultaneously transmits a second instruction to the second tablet computer to enable the second tablet computer to display the right half of the picture. Alternatively, if a picture is to be displayed on four tablet computers with the same parameters and the four tablet computers are placed in a "田" shape, as shown in FIG. 2, the third electronic device transmits display instructions to the four tablet computers respectively to enable the first tablet computer PAD1 to display an upper left quarter of the picture, the second tablet computer PAD2 to display an upper right quarter of the picture, the third tablet computer PAD3 to display a lower left quarter of the picture, and the fourth tablet computer PAD4 to display a lower right quarter of the picture. Thereby, display content of the four display units can be spliced into a complete display interface corresponding to the original picture.

For step S2, before the two electronic devices execute the same program and collectively display an execution interface of the first application program, in order to ensure that the first object can be synchronously displayed on the first display unit and the second display unit, it needs to further synchronize a first timeline module in the first electronic device with a second timeline module in the second electronic device.

In the embodiment of the present application, step S2 of synchronizing, by the first electronic device, with the second electronic device in the method according to the embodiment of the present application can be implemented in the following manner.

1) the first electronic device establishing a communication channel with the second electronic device.

Specifically, in the embodiment of the present application, when it needs to enable the first application program to be executed collectively on the first electronic device and the second electronic device, the first electronic device will firstly establish a communication connection with the second electronic device, so as to implement the subsequent synchronization process. In addition, in order to reduce the operation steps and enhance the operation efficiency of the electronic devices, the communication connection in step S1 may be the same as that in step S2. Further, a negotiation channel for determining display content of the first display unit and the second display unit and a time channel for synchronizing the first timeline module with the second timeline module are set in the communication channel.

In a specific implementation, the communication connection between the first electronic device and the second electronic device may be implemented via a data line, so as to implement communication between the first electronic device and the second electronic device. Further, in order to facilitate a user in implementing the communication connection between the two electronic devices, the communication connection between the first electronic device and the second electronic device may also be implemented via a wireless WIFI network, Bluetooth, or infrared. The specific manner of communication connection may be set by those skilled in the art according to practical requirements, and is not limited in the present application.

2) synchronizing the first electronic device with the second electronic device through the first timeline module in the first electronic device and the second timeline module in the second electronic device.

Specifically, in the embodiment of the present application, in order to ensure that the first display unit and the second display unit can be synchronized for display, it needs to synchronize the time of the first timeline module with the time of the second timeline module. In a specific implementation, assuming that time of the first timeline module in the first electronic device is taken as a reference, the time of the first timeline module is transmitted to the second electronic device. After the second electronic device receives the time of the first timeline module, the second electronic device updates the time of the second timeline module of its own to the time of the first timeline module. Thus, synchronization between the first timeline module and the second timeline module is implemented, and thereby, synchronization between the first electronic device and the second electronic device is implemented.

Of course, the first timeline module may also be synchronized with the second timeline module by the third electronic device. The specific process is as follows.

The first electronic device transmits the time of the first timeline module to the third electronic device, and the second electronic device transmits the time of the second timeline module to the third electronic device at the same time. The third electronic device firstly judges whether the time of the first timeline module is the same as the time of the second timeline module, i.e., whether the first timeline module is synchronous with the second timeline module.

if a judgment result indicates that the first timeline module is synchronous with the second timeline module, i.e., the time of the first timeline module is the same as the time of the second timeline module, the third electronic device needs not to further adjust the first timeline module and the second timeline module; and if the judgment result indicates that the first timeline module is asynchronous with the second timeline module, the third electronic device transmits time of a timeline module of its own to the first electronic device and the second electronic device respectively. After the first electronic device and the second electronic device receive the time of the timeline module from the third electronic device, the first electronic device and the second electronic device update the time of the first timeline module and the time of the second timeline module, so as to enable the first electronic device to be synchronous with the second electronic device.

In a specific implementation, step S2 may be performed firstly, and then step S1 is performed, i.e., the first electronic device firstly synchronizes with the second electronic device, and the content needed to be displayed on the first display unit and the second display unit respectively is then determined. The specific order may be set by those skilled in the art according to practical requirements, which is not limited in the present application.

For step S3, after the data of the first part to be displayed on the first display unit and the data of the second part to be displayed on the second display unit are determined and the first electronic device synchronizes with the second electronic device, it needs to display an execution interface of the first application program on the first display unit and the second display unit. The display process of the first display unit will be described below.

1) receiving, by a first graphics processor in the first electronic device, the data of the first part from a central processing unit in the first electronic device when the first application program is running.

Specifically, when the first application program, for example, a webpage browser is running, the central processing unit of the first electronic device will generate the data of the first part of the first application program displayed on the first display unit, and the first graphical processor in the first electronic device, for example, a graphics card will receive the data of the first part from the central processing unit.

2) processing, by the graphics processor, the data of the first part to acquire first output content.

Specifically, after the first graphics processor, for example, the graphics card, receives the data of the first part from the central processing unit, the first graphics processor further processes the data of the first part to acquire data capable of being displayed.

3) storing the first output content in a first display memory of the first electronic device.

4) performing, by a first random read-write storage digital-to-analog converter in the first electronic device, digital-to-analog conversion on the first output content to acquire first analog content corresponding to the first output content, and transmitting the first analog content to the first display unit for display.

Specifically, under normal conditions, the data of the first part stored in the first display memory of the first electronic device is digital data. Therefore, in order to enable the data of the first part to be displayed on the first display unit, it further needs to convert the digital data corresponding to the data of the first part into analog data. The first random read-write storage digital-to-analog converter converts the data of the first part from digital data into analog data, and transmits the converted data to the first display unit for display.

The display process of the second display unit is similar to that of the first display unit, and detailed description will be omitted here.

In the embodiment of the present application, when the whole display area corresponding to the first display unit can only display the data of the first part in the first object, for example, the first display unit can only display an upper half of a webpage, the data of the second part is data not capable of being displayed on the first display unit in the first object except for the data of the first part, for example, a lower half of the webpage.

Alternatively, when the whole display area corresponding to the first display unit can completely display the first object, the data of the second part is display data corresponding to the second display area in the whole display area when the first object is completely displayed on the first display unit. For example, when a webpage is capable of being completely displayed within the display area of the first display unit, but it needs two display units to display the webpage in order to achieve a better display effect for a user, the above method is still valid. When the first electronic device is placed on the right side of the second electronic device, the second display unit is enabled to display the left half of the webpage, and the first display unit is enabled to display the right half of the webpage when the webpage is completely displayed within the display area of the first display unit.

Further, in the embodiment of the present application, the first application program is an application program with a corresponding time synchronization value representing the degree of time synchronization being smaller than a preset synchronization value. Specifically, the first application program according to the embodiment of the present application may be a static webpage, a board game etc.

With reference to FIG. 3, the embodiments of the present disclosure provide a first electronic device including: a first acquisition unit 1 configured to acquire data of a first part in a first object needed to be displayed on the first display unit, wherein, data of a second part in the first object different from the data of the first part is determined to be displayed on the second display unit; a first synchronization unit 2 configured to synchronize the first electronic device with the second electronic device; a first execution processing unit 3 configured to display the data of the first part on the first display unit by the first electronic device synchronously executing the first application program corresponding to the first object while displaying the data of the second part on the second display unit by the second electronic device executing the first application program.

Figure 4:
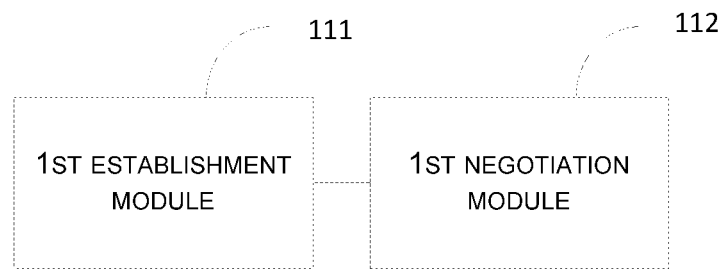
FIG. 4 is a first structure schematic diagram of a first acquisition unit according to an embodiment of the present application.

Further, in a specific implementation, the first acquisition unit 1 further includes a first negotiation unit 1. When the first electronic device and the second electronic device negotiate content of the first part and content of the second part, the first negotiation unit 1, as shown in FIG. 4, further includes: a first establishment module 111 configured to establish a communication connection between the first electronic device and the second electronic device; a first negotiation module 112 configured to enable the first electronic device to negotiate with the second electronic device, so as to determine the data of the first part to be displayed on the first display unit.

Figure 5:
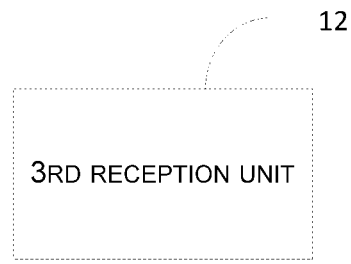
FIG. 5 is a second structure schematic diagram of a first acquisition unit according to an embodiment of the present application.

When the third electronic device negotiates the content of the first part and the content of the second part, the first negotiation unit 1, as shown in FIG. 5, further includes: a first reception unit 12 configured to acquire the data of the first part needed to be displayed on the first display unit which is determined by the third electronic device; wherein, the third electronic device is different from both the first electronic device and the second electronic device. The third electronic device is further configured to determine data of the second part needed to be displayed on the second display unit.

Figure 6:
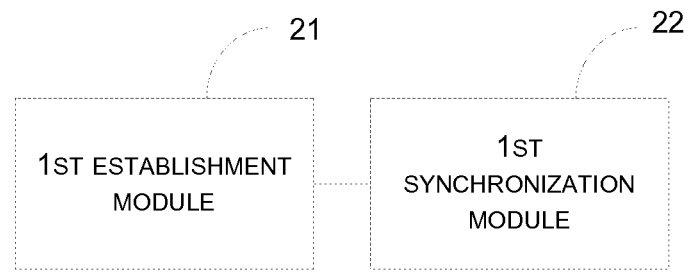
FIG. 6 is a structure schematic diagram of a first synchronization unit according to an embodiment of the present application.

In order to synchronize the first electronic device with the second electronic device, the first synchronization unit 2, as shown in FIG. 6, further includes: a second establishment module 21 configured to establish a communication channel between the first electronic device and the second electronic device; a first synchronization module 22 configured to synchronize the first electronic device with the second electronic device through the first timeline module in the first electronic device and the second timeline module in the second electronic device.

In the embodiment of the present application, when the whole display area corresponding to the first display unit can only display the data of the first part in the first object, for example, the first display unit can only display an upper half of a webpage, the data of the second part is data not capable of being displayed on the first display unit in the first object except for the data of the first part, for example, a lower half of the webpage. Alternatively, when the whole display area corresponding to the first display unit can completely display the first object, the data of the second part is display data corresponding to the second display area in the whole display area when the first object is completely displayed on the first display unit. For example, when a webpage can be completely displayed within the display area of the first display unit and the first electronic device is placed on the right side of the second electronic device, the second part is the right half when the webpage is completely displayed within the display area of the first display unit.

Further, in the embodiment of the present application, the first application program is an application program with a corresponding time synchronization value representing the degree of time synchronization being smaller than a preset synchronization value. Specifically, the first application program according to the embodiment of the present application may be a static webpage, a board game etc.

One or more of the above technical solutions according to the embodiments of the present application at least include the following technical effects.

1. In the technical solutions of the present application, the data of the first part of the first object needed to be displayed on the first display unit and the data of the second part needed to be displayed on the second display unit are acquired through negotiation between the two electronic devices, and the first electronic device is synchronized with the second electronic device, so as to ensure that the data of the first part and the data of the second part can be synchronously displayed on the first display unit and the second display unit. Further, the first application program corresponding to the first object is executed in the first electronic device execute and the data of the first part is displayed on the first display unit while the first application program is executed in the second electronic device and the data of the second part is displayed on the second display unit. This solves the technical problem that it needs to write additional special codes to enable executing an application program in two or more electronic devices simultaneously, so as to enable displaying output content of the program during the runtime collectively on two or more display units, and achieves the technical effect that two electronic devices can automatically display different parts of the display interface of the first application program during the runtime according to a negotiation result when they are placed together, so as to achieve displaying the output content of the first application program during the runtime on two display units without writing additional special codes.

2. In the technical solutions of the present application, the data of the first part of the first object needed to be displayed on the first display unit and the data of the second part needed to be displayed on the second display unit are acquired by the first electronic device or the third electronic device. Therefore, this avoids the cases that when the output content of the first application program during the runtime is collectively displayed, the output content may be displayed repeatedly or missed or the display content of two display units cannot be spliced into a complete image, and thus ensures the technical effect of completely displaying the output content of the first application program during the runtime without any repetition, and provides better user experience.

3. In the technical solutions of the present application, a communication connection is established between the first electronic device and the second electronic device, and the first electronic device is synchronized with the second electronic device through the first timeline module in the first electronic device and the second timeline module in the second electronic device. This achieves the technical effect of enabling the first electronic device and the second electronic device to execute the first application program synchronously and enabling the first display unit and the second display unit to display the output content of the first application program during the runtime synchronously.

4. The technical solutions of the present application can effectively solve the above technical problems and achieve corresponding technical effects. Therefore, a user can use two or more electronic devices to execute the same program synchronously and view the output content of the program during the runtime on two or more display units, largely enhancing user experience.

Other Embodiments

The embodiments of the present disclosure provide an information processing method applied in an integrated system including multiple electronic devices. Distances among the multiple electronic devices are smaller than a preset threshold. The method includes: when a control instruction is received, converting the control instruction into an instruction sequence including multiple decomposition instructions based on attribute parameters of the multiple electronic devices; transmitting the multiple decomposition instructions to corresponding electronic devices respectively according to correspondence relationships between the decomposition instructions in the instruction sequence and the multiple electronic devices, so as to control operations of the multiple electronic devices.

The method of the present disclosure is applicable to an integrated system. The integrated system is comprised of multiple electronic devices which are physically close to each other (i.e., distances among the multiple electronic devices are smaller than a preset threshold). In a scenario of a party or a conference with many people, direct distances among electronic devices carried by individual participants are within a specified range. Therefore, the multiple electronic devices which are physically close to each other are set in an integrated system in the embodiment of the present disclosure, and then are utilized reasonably based on hardware and software conditions of various electronic devices, achieving a beneficial effect of maximizing the utilization of the conditions of the electronic devices under the same scenario.

In addition, resources can be shared among various electronic devices in the integrated system and the optimized resources can be used to deal with current user requirements, enhancing a processing speed of the electronic devices and the obtained effect.

Figure 7:
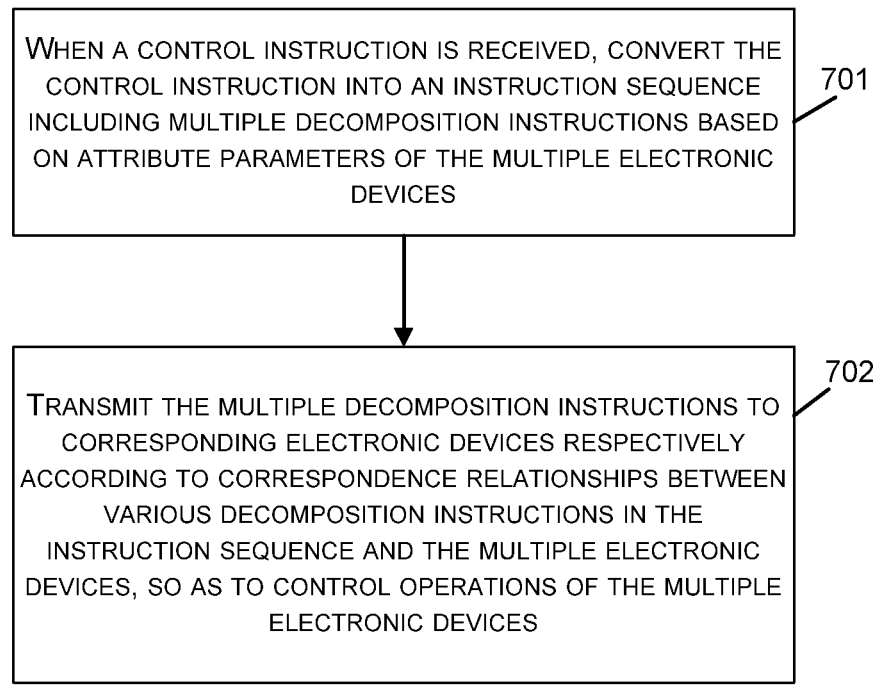
FIG. 7 is a schematic flowchart of an information processing method according to an embodiment of the present disclosure.

The embodiments of the present disclosure provide an information processing method. The specific implementations of the present disclosure will be described in detail below in conjunction with accompanying drawings of the specification (as shown in FIG. 7).

The method is applied in an integrated system including multiple electronic devices. Distances among the multiple electronic devices are smaller than a preset threshold (a specific application environment may be a party or conference scenario and distances among various electronic devices are less than a preset threshold). The method includes:

Step 701: when a control instruction is received, converting the control instruction into an instruction sequence including multiple decomposition instructions based on attribute parameters of the multiple electronic devices.

In the embodiment of the present disclosure, the attribute parameters are parameters representing the data processing capability and display effect of the electronic device. Therefore, the attribute parameters include hardware parameters and installed software parameters of the electronic devices.

Step 702: transmitting the multiple decomposition instructions to corresponding electronic devices respectively according to correspondence relationships between various decomposition instructions in the instruction sequence and the multiple electronic devices, so as to control operations of the multiple electronic devices.

The integrated system includes multiple electronic devices, and the software and hardware parameters of various electronic devices are different under normal conditions. Therefore, implementation of a control instruction will achieve different effects. Thus, in the integrated system according to the embodiment of the present disclosure, the integrated system comprised of multiple electronic devices is used as a main body to receive the control instruction, parses the control instruction after receiving the control instruction, and determines a specific function of the control instruction and an effect to be achieved according to the parsed result. Then, the control instruction may be decomposed into multiple functional modules based on the specific software and hardware conditions of the various electronic devices in the system, so as to enable different functional requirements to be transmitted to electronic devices being good at processing such functional requirements for specific process. Therefore, the method according to the embodiment of the present disclosure can coordinate the use of various electronic devices in the integrated system, achieving an effect of optimizing the process of data.

The method according to the embodiment of the present disclosure can reasonably decompose different control instructions based on different specific processing capabilities, and coordinates various electronic devices in the integrated system to implement the processing capabilities. In order to further illustrate the method of the present disclosure, the method will be described in detail below by taking the following two specific examples.

First: when the control instruction is a first control instruction for controlling the execution of the first application program, converting the control instruction into an instruction sequence including multiple decomposition instructions based on attribute parameters of the multiple electronic devices includes the following steps.

Under most cases, the execution of one application program will correspond to the execution of related display content, and the corresponding instructions in the embodiment include two parts, i.e., execution of programs and division of display content. Therefore, the specific implementation of the embodiment includes:

A. determining a first electronic device configured with the first application program based on the attribute parameters of the multiple electronic devices.

The attribute parameters here may be parameters corresponding to the following software and hardware:

an Operating System (OS), a language processing system (a translation program), a database management system, hardware, a power supply, a main board, a CPU, a memory, a hard disk, a sound card, a graphics card, a network card, a modem, a floppy drive, a CD-ROM, a display, a sound box, a flash disk video device, a mobile storage card, or a card reader etc.

In the present embodiment, determining a first electronic device configured with the first application program based on the attribute parameters of the multiple electronic devices may be implemented by:

when there are multiple first electronic devices, acquiring hardware attribute parameters of the multiple first electronic devices;

comparing the hardware attribute parameters of the various first electronic devices, and determining one of the multiple first electronic devices to execute the first application program based on a comparison result.

B. determining a second electronic device of which a display parameter meets a first preset condition based on the attribute parameters of the multiple electronic devices, the first electronic device being different from the second electronic device.

This step may not be included in the present embodiment, since execution of an application program does not necessarily correspond to execution of display content. However, when the execution of an application program corresponds to execution of display content, the use of multiple electronic devices with a display unit may be coordinated, so as to splice the display units of the multiple electronic devices into a large display unit for specific display.

In addition, under most cases, various electronic devices have respective optimized characteristics. Therefore, when an application program is executed, among the various electronic devices in the integrated system, an electronic device may have the best processing capability, and another electronic device may have the best display effect. With the method of the present disclosure, the two conditions may be integrated together for use. That is, with an operation of decomposing an instruction, the operation of executing the application program is performed by the electronic device with a powerful processing capability and the operation of displaying the application program is performed by the electronic device with a better display effect.

C. encapsulating a correspondence relationship between an execution instruction of the first application program and the first electronic device into a first decomposition instruction; and encapsulating a correspondence relationship between a display and output instruction after the first application program is executed and the second electronic device into a second decomposition instruction;

the manner of dividing one display content into multiple display blocks and transmitting the display blocks to different electronic devices for display may further includes:

encapsulating a correspondence relationship between a display and output instruction after the first application program is executed and the second electronic device into a second decomposition instruction by:

when there are multiple second electronic devices, determining, by position means, relative positions of the multiple second electronic devices;

dividing the display content after the first application program is executed into multiple display content blocks according to a number of the second electronic devices;

determining a correspondence relationship between various second electronic devices and various display content blocks according to the relative positions of the multiple second electronic devices;

encapsulating the correspondence relationship between various second electronic devices and the display content blocks into the second decomposition instruction.

D. combining the first decomposition instruction and the second decomposition instruction into an instruction sequence.

Second: when the control instruction is a second control instruction for controlling the electronic device to display an image, converting the control instruction into an instruction sequence including multiple decomposition instructions based on attribute parameters of the multiple electronic devices includes:

determining, by position means, relative positions of multiple electronic devices;

dividing the display image into multiple image blocks according to a number of the electronic devices;

determining a correspondence relationship between each electronic device and each image block according to the relative positions of the multiple electronic devices;

encapsulating the correspondence relationship between each electronic devices and the display content block into a decomposition instruction, and combining decomposition instructions corresponding to the multiple electronic devices into an instruction sequence.

Figure 8:
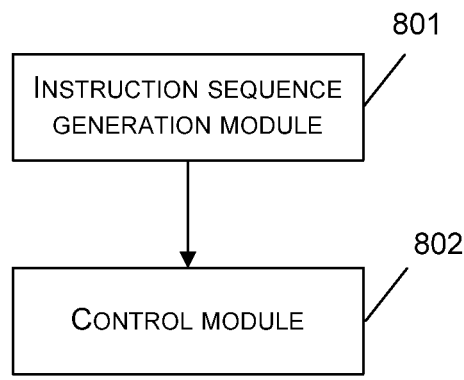
FIG. 8 is a structure schematic diagram of an information processing apparatus according to an embodiment of the present disclosure.

As shown in FIG. 8, according to the above method, the present disclosure further provides an information processing apparatus applied in an integrated system. The integrated system includes multiple electronic devices. Distances among the multiple electronic devices are smaller than a preset threshold. The information processing apparatus includes:

an instruction sequence generation module 801 configured to convert a control instruction into an instruction sequence including multiple decomposition instructions based on attribute parameters of the multiple electronic devices when the control instruction is received;

a control module 802 configured to transmit the multiple decomposition instructions to corresponding electronic devices respectively according to correspondence relationships between various decomposition instructions in the instruction sequence and the multiple electronic devices, so as to control operations of the multiple electronic devices.

The method according to the embodiment of the present disclosure can reasonably decompose different control instructions based on different specific processing capabilities, and coordinates various electronic devices in the integrated system to implement the processing capabilities. The instruction sequence generation module 801 includes different units based on a specific usage scenario.

First: when the control instruction is a first control instruction for controlling the execution of the first application program, the instruction sequence generation module 801 includes:

a first electronic device determination unit configured to determine a first electronic device configured with the first application program based on the attribute parameters of the multiple electronic devices.

When there are multiple first electronic devices, the first electronic device determination unit is further configured to acquire hardware attribute parameters of the multiple first electronic devices; and compare the hardware attribute parameters of the various first electronic devices, and determine one of the multiple first electronic devices to execute the first application program based on a comparison result.

a second electronic device determination unit configured to determine a second electronic device of which a display parameter meets a first preset condition based on the attribute parameters of the multiple electronic devices, the first electronic device being different from the second electronic device;

a decomposition instruction generation unit configured to encapsulate a correspondence relationship between an execution instruction for the first application program and the first electronic device into a first decomposition instruction; and encapsulate a correspondence relationship between a display and output instruction after the first application program is executed and the second electronic device into a second decomposition instruction;

the decomposition instruction generation unit configured to encapsulate a correspondence relationship between a display and output instruction after the first application program is executed and the second electronic device into a second decomposition instruction by when there are multiple second electronic devices, determining, by position means, relative positions of the multiple second electronic devices;

dividing the display content after the first application program is executed into multiple display content blocks according to a number of the second electronic devices;

determining a correspondence relationship between various second electronic devices and various display content blocks according to the relative positions of the multiple second electronic devices;

encapsulating the correspondence relationship between various second electronic devices and the display content blocks into the second decomposition instruction.

a combination unit configured to combine the first decomposition instruction and the second decomposition instruction into an instruction sequence.

Second: when the control instruction is a second control instruction for controlling the electronic device to display an image, the instruction sequence generation module 801 includes:

a position determination unit configured to determine relative positions of multiple electronic devices by position means;

a block division module configured to divide the display image into multiple image blocks according to a number of the electronic devices;

a correspondence relationship determination unit configured to determine a correspondence relationship between each electronic device and each image block according to the relative positions of the multiple electronic devices;

a second combination module configured to encapsulate the correspondence relationship between each electronic device and the display content block into a decomposition instruction, and combine decomposition instructions corresponding to the multiple electronic devices into an instruction sequence.

One or more of the above technical solutions according to the embodiments of the present application at least include the following technical effects.

The method and apparatus of the present disclosure are applicable to an integrated system. The integrated system is comprised of multiple electronic devices which are physically close to each other (i.e., distances among the multiple electronic devices are smaller than a preset threshold). In a scenario of a party or a conference with many people, direct distances among electronic devices carried by individual participants are within a preset range. Therefore, the electronic devices which are physically close to each other are set in an integrated system in the embodiment of the present disclosure, and then are utilized reasonably based on hardware and software conditions of various electronic devices, achieving a beneficial effect of maximizing the utilization of the conditions of the electronic devices under the same scenario.

In addition, resources can be shared among various electronic devices in the integrated system and the optimized resources can be used to deal with current user requirements, enhancing a processing speed of the electronic devices and the obtained effect.

Figure 9:
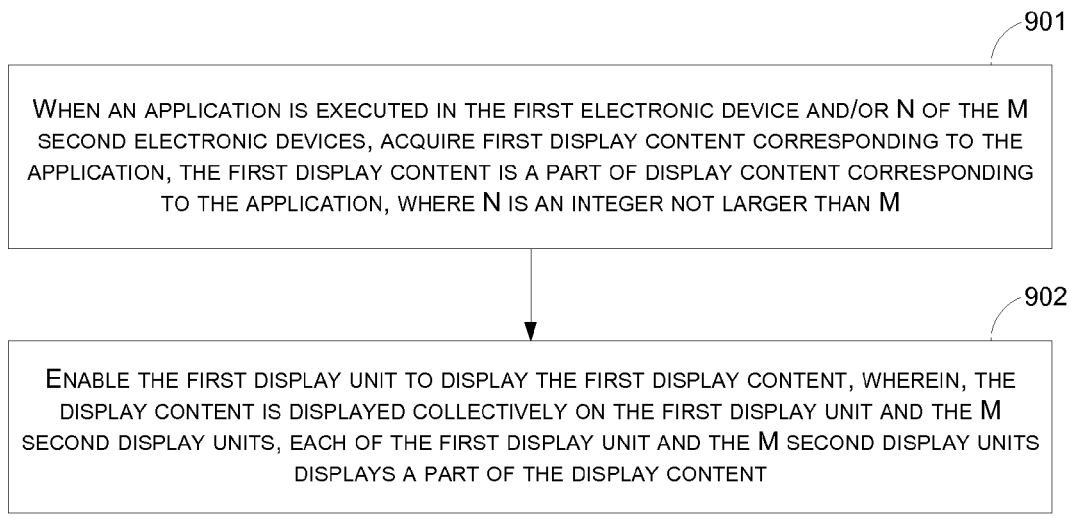
FIG. 9 is a primary schematic flowchart of a display method according to an embodiment of the present disclosure.

In addition, with reference to FIG. 9, the embodiments of the present disclosure provide a display method capable of being applied in a first electronic device including a first display unit. The first electronic device may be communicated with M second electronic devices. Each of the M second electronic devices includes a second display unit, and therefore, the M second electronic devices totally include M second display units, and the first display unit is spliced with the M second display units, where M is a positive integer. The primary process of the method is as follows.

Step 901: when an application is executed in the first electronic device and/or N of the M second electronic devices, acquiring first display content corresponding to the application. The first display content is a part of display content corresponding to the application, where N is an integer not larger than M.

Figure 10:
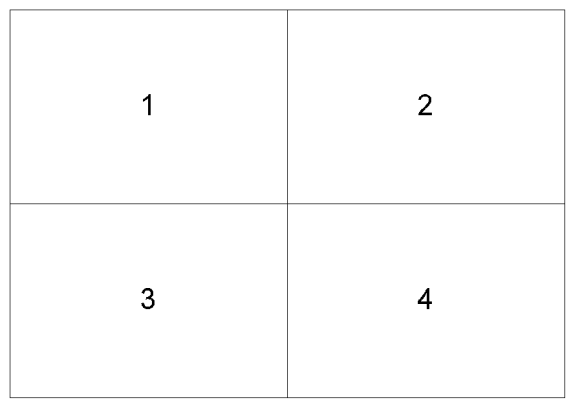
FIG. 10 is a schematic diagram of a third display unit according to an embodiment of the present disclosure.

In the embodiment of the present disclosure, the first display unit is spliced with the M second display units. For example, the first electronic device may be close to the M second electronic devices, and the first display unit is spliced with the M second display units to form a new display unit, which may be referred to as a third display unit. The third display unit may be comprised of a part or all of the first display unit and a part or all of each of the M second display units, As shown in FIG. 10, M=3 is taken as an example. In FIG. 10, 1 represents the first display unit, 2, 3 and 4 represent 3 second display units respectively. In FIG. 10, the sizes of the first display unit and the 3 second display units being consistent is taken as an example, while in practical applications, the sizes of various display units may not necessarily be the same. It can be seen from FIG. 10 that, 4 display units are spliced into a new display unit, i.e., the third display unit. It can be seen that, a display area of the third display unit is obviously larger than that of any of the 4 display units, effectively enlarging display area so as to facilitate more users in watching.

In the embodiment of the present disclosure, the first electronic device may be communicated with any two of the M second electronic devices in a wired manner or a wireless manner, which is not limited in the present disclosure.

In the embodiment of the present disclosure, the application may be executed in any one or more of the first electronic device and the M second electronic devices. For example, the application may be executed in the first electronic device, in one of the second electronic devices, in multiple electronic devices, or in all the electronic devices. In short, the application only needs to be executed in at least one of the first electronic device and the M second electronic devices.

When the application is executed in the first electronic device and/or N of the M second electronic devices, the first electronic device may acquire the first display content corresponding to the application.

For example, the application may corresponds to a display window, and the display window is all content of the application needed to be displayed, i.e., the display content. Since the first display unit and the M second display units are spliced into the third display unit, the display content is to be displayed on the third display unit. Obviously, only a part of the display content needs to be displayed on the first display unit, i.e., the first display content is a part of the display content.

The embodiment will be described below in two cases.

First Case

The first electronic device and the M second electronic devices are in a completely equal relationship, i.e., there is no controlling electronic device, and various electronic devices can negotiate to implement collective display.

The first electronic device acquiring the first display content corresponding to the application further includes: the first electronic device negotiating with the M second electronic devices to determine the first display content needed to be displayed on the first display unit. Similarly, each of the M second electronic devices may also determine the content needed to be displayed on itself by negotiation.

Second Case

There is a controlling electronic device in the first electronic device and the M second electronic devices for controlling itself and other electronic devices.

Firstly, it should consider how to select the controlling electronic device. The controlling electronic device may be specified by a user, or may be determined randomly when the first electronic device and the M second electronic devices are connected, or may be an electronic device in which the application is executed. For the last case, if the application is executed in multiple electronic devices, the electronic device in which the application is firstly executed may be selected as the controlling electronic device.

After an electronic device is selected as the controlling electronic device, the electronic device may always be used as the controlling electronic device, i.e., once the controlling electronic device is selected, it will not be changed. Alternatively, the controlling electronic device may also be changed at any time. For example, if the electronic device in which the application is executed is selected as the controlling electronic device, when the application is not executed in this electronic device again, the electronic device will not be used as the controlling electronic device any more.

In short, there may be multiple specific implementations, which are not limited in the present disclosure.

For example, the first electronic device is used as the controlling electronic device. Acquiring the first display content corresponding to the application may further include acquiring the display content corresponding to the application; and determining the content needed to be displayed on first display unit and the M second display units respectively from the display content, wherein, the first display content needs to be displayed on the first display unit.

That is, no matter which electronic device for executing the application, if the first electronic device is used as the controlling electronic device, the first electronic device needs to firstly acquire the display content corresponding to the application, and after acquiring the display content, the first electronic device may determine the first display content needed to be displayed on the first display unit and content needed to be displayed respectively on the M second display units from the display content.

After the content needed to be displayed respectively on the M second display units is determined, the first electronic device may transmit a display instruction to each of the M second electronic devices to indicate the M second display units to display the content respectively.

When the first electronic device transmits the display instruction to each of the M second electronic devices and each of the M second electronic devices receives the display instruction, each of the M second electronic devices may generate content needed to be displayed on itself according to the display instruction and display the content. Thereby, the display instruction transmitted by the first electronic device carries less data, enhancing efficiency of information transmission.

Alternatively, the first electronic device may carry the specific content needed to be displayed on the various second electronic devices respectively in the display instructions transmitted to different second electronic devices. The corresponding second electronic devices may directly display the content after receiving the display instructions, without generating the corresponding display content any more. Thus, the first electronic device may transmit the content needed to be displayed to the various second electronic devices, and various second electronic devices need not to generate corresponding content needed to be displayed by itself any more, enhancing accuracy of information transmission.

Step 902: enabling the first display unit to display the first display content; wherein, the display content is displayed collectively on the first display unit and the M second display units, and each of the first display unit and the M second display units displays a part of the display content.

After the first electronic device determines that the content needed to be displayed on first display unit is the first display content, the first display unit is enabled to display the first display content. At the same time, the M second electronic devices may also display the content needed to be displayed by themselves on respective second display units. Thus, the first display unit and the M second display units display parts of the display content respectively, achieving an effect of displaying the display content collectively on the first display unit and the M second display units.

Two cases have been described in step 901. The implementation of the embodiment of the present disclosure will still be described in such two cases.

First Case

The first electronic device and the M second electronic devices are in a completely equal relationship, i.e., there is no controlling electronic device, and various electronic devices can negotiate to implement collective display.

As described above, the first display unit and the M second display units constitute a third display unit.

Preferably, the first electronic device enabling the first display unit to display the first display content may further include negotiating with the M second electronic devices according to a first size of the first display unit, to determine a first display area on the first display unit; and displaying the first display content in the first display area.

That is, various electronic devices need to firstly negotiate respective display areas. For example, when the first electronic device is displaying the first display content, the display area being used may be equal to or smaller than the whole display area of the first display unit. A specific size of the area occupied in the first display area needs to be determined by negotiation among the various electronic devices.

Generally, it needs to ensure that the third display unit is a display unit in a regular shape as much as possible. That is, the third display area of the third display unit is enabled to be a display area in a regular shape, for example, a rectangle, a circle etc., complying with users' view requirements and facilitating complete display of the content.

Figure 11:
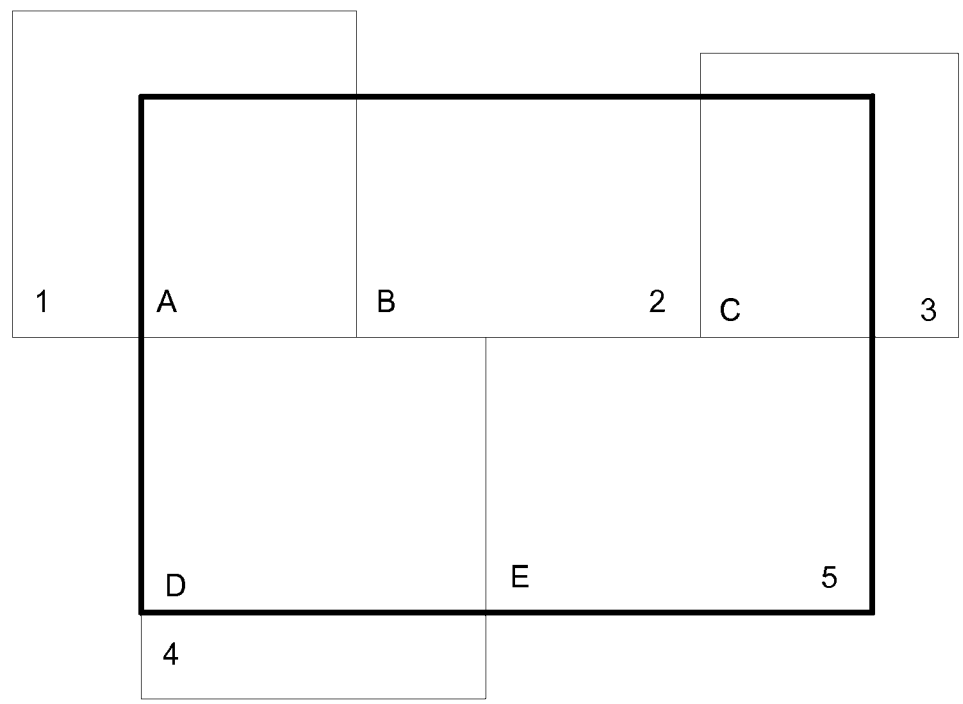
FIG. 11 is a schematic diagram of a third display unit according to an embodiment of the present disclosure.

For example, as shown in FIG. 11, M=4 is taken as an example, i.e., totally 5 electronic devices are spliced. In FIG.

11, 1 represents the first display unit, 2, 3, 4 and 5 represent 4 second display units respectively. It can be seen from FIG. 11 that, when the third display area is determined, it is obviously impossible to utilize the whole display area of each electronic device.

FIG. 11 illustrates the third display area in bold line. It can be seen that, the third display area is a display area in a regular shape. In FIG. 11, a rectangle is taken as an example, In FIG. 11, A represents a part of the whole display area of the first display unit belonging to the third display area. That is, when the first display content is displayed, it is only displayed in part A instead of other areas in the whole display area of the first display unit except for part A. The same is true for the other second electronic devices.

Therefore, various electronic devices need to negotiate according to sizes of respective display units, so as to determine the display area needed to be used by each display unit, and then display the content according to the determined areas. For example, the first electronic device negotiates with various second electronic devices according to the first size of the first display unit, so as to determine the first display area (for example, area A in FIG. 11) needed to be used in the whole display area of the first display unit. After the determination, the first electronic device may control the display content to be displayed in the first display area instead of other areas in whole display area of the first display unit except for the first display area.

It can be seen from FIG. 11 that, various display units cooperate to. display the display content collectively.

Preferably, enabling the first display unit to display the first display content may include negotiating with the M second electronic devices according to a first display resolution of the first display unit, so as to determine whether the first display resolution of the first display unit is consistent with M second display resolutions of the M second display units; and when the first display resolution of the first display unit is consistent with M second display resolutions of the M second display units, enabling the first display unit to display the first display content.

That is, when various electronic devices need to display the display content, it needs to firstly unify the resolutions. Display units of different electronic devices may have different resolutions. Therefore, various electronic devices need to firstly negotiate according to the resolutions of the respective display units.

For example, the first electronic device may firstly negotiate with the M second electronic devices according to the first display resolution of the first display unit, so as to determine whether the display resolutions of the M second electronic devices are the same as the first display resolution, i.e., determining whether the first display resolution is consistent with the M second display resolutions of the M second display units.

In the embodiment of the present disclosure, if it is determined that the first display resolution is consistent with the M second display resolutions, the first electronic device enables the first display content to be displayed on the first display unit.

In the embodiment of the present disclosure, if it is determined that the first display resolution is inconsistent with some of the M second display resolutions, i.e., if it is determined that two of the M second display resolutions are inconsistent with the first display resolution, the various display resolutions need to be firstly adjusted to be consistent.

In an adjustment process, the various display resolutions may be adjusted to a new display resolution, or may be adjusted to be the same as one of these display resolutions.

For example, assume that M=2, the first display resolution is 1, the first second display resolution is 2, and the second second display resolution is 3. Thus, various display resolutions are inconsistent. Various electronic devices may negotiate to adjust the first display resolution, the first second display resolution, and the second second display resolution to 4, i.e., to a new display resolution. Alternatively, the various electronic devices may negotiate to adjust both the first display resolution and the first second display resolution to 3, i.e., to a display resolution which is the same as the second second display resolution.

In short, the specific adjustment manner is not limited in the present disclosure, as long as the display resolutions of various display units are adjusted to be consistent.

After the display resolutions of the various display units are consistent, the various electronic devices may control corresponding display units to display content needed to be displayed. For example, the first electronic device controls the first display unit to display the first display content.

In the embodiment of the present disclosure, the determination of the size of the display unit and the determination of the display resolution of the display unit may be performed in a random order or simultaneously, which is not limited in the present disclosure.

Second Case

There is a controlling electronic device in the first electronic device and the M second electronic devices for controlling itself and other electronic devices.

As described above, the first display unit and the M second display units constitute a third display unit.

Preferably, the first electronic device enabling the first display unit to display the first display content may further include determining a display area according to a first size of the first display unit and M second sizes of the M second display units, the display area being comprised of the first display area of the first display unit and the M second display areas of the M second display units; enabling the display content to be displayed in the display area, wherein, the first display content is located in the first display area, and remaining display content in the display content except for the first display content is located in the M second display areas.

That is, the controlling electronic device needs to determine the display areas needed to be displayed on various display units according to the sizes of the various display units of the various electronic devices.

For example, when the first electronic device displays the first display content, the display area being used may be equal to or smaller than the whole display area of the first display unit. A specific size of the area occupied in the first display area needs to be determined by the controlling electronic device.

Generally, it needs to ensure that the third display unit is a display unit in a regular shape as much as possible. That is, the third display area of the third display unit is enabled to be a display area in a regular shape, for example, a rectangle, a circle etc., complying with users' view requirements and facilitating complete display of the content.

For example, with reference to FIG. 11 as well, FIG. 11 illustrates the third display area in bold line. It can be seen that, the third display area is a display area in a regular shape. In FIG. 11, a rectangle is taken as an example. In FIG. 11, A represents a part of the whole display area of the first display unit belonging to the third display area. That is, when the first display content is displayed, it is only displayed in part A instead of other areas in the whole display area of the first display unit except for part A. The same is true for the other second electronic devices.

Therefore, the controlling electronic device needs to determine the display area needed to be used by each display unit according to sizes of the display units of various electronic devices, and then enables the various electronic devices to display the content according to the determined areas.

For example, the first electronic device is taken as an example of a controlling electronic device. The first electronic device firstly needs to know the first size of the first display unit and the M second sizes of the M second electronic devices. For example, the first electronic device may transmit request messages to the M second electronic devices, to acquire the M second sizes of the M second electronic devices, or the M second electronic devices may actively transmit the M second sizes to the first electronic device.

After the first size and the M second sizes are known, the first electronic device determines the first display area (for example, area A in FIG. 11) needed to be used in the whole display area of the first display unit according to the various sizes, and determine the second display areas (for example, areas B, C, D and E in FIG. 11) needed to be displayed on the various second display units respectively. After the determination, the first electronic device may control the first display content to be displayed in the first display area instead of other areas in the whole display area of first display unit except for the first display unit, and transmit display instructions to the M second electronic devices respectively, to instruct the M second electronic devices to display the corresponding content in the respective second display areas.

When the first electronic device transmits the display instruction to each of the M second electronic devices and each of the M second electronic devices receives the display instruction, each of the M second electronic devices may generate content needed to be displayed on itself according to the display instruction and display the content. Thereby, the display instruction transmitted by the first electronic device carries less data, enhancing efficiency of information transmission.

Alternatively, the first electronic device may carry the specific content needed to be displayed on the various second electronic devices respectively in the display instructions transmitted to different second electronic devices. The corresponding second electronic devices may directly display the content after receiving the display instructions, without generating the corresponding display content any more. Thus, the first electronic device may transmit the content needed to be displayed to the various second electronic devices, and various second electronic devices needs not to generate corresponding content needed to be displayed by itself any more, enhancing accuracy of information transmission.

Preferably, enabling the first display unit to display the first display content may include the first display unit judging whether the first display resolution of the first display unit is consistent with M second display resolutions of the M second display units; and when the first display resolution of the first display unit is consistent with M second display resolutions, enabling the first display unit to display the first display content and enabling the M second display units to display the remaining display content in the display content.

That is, when various electronic devices are enabled to display the display content, it needs to firstly unify the resolutions. Display units of different electronic devices may also have different resolutions. Therefore, the controlling electronic device needs to firstly perform processing according to the resolutions of the display units of various electronic devices.

For example, the first electronic device is taken as an example of a controlling electronic device. The first electronic device firstly needs to know the first display resolution of the first display unit and the M second display resolutions of the M second electronic devices. For example, the first electronic device may transmits request messages to the M second electronic devices, to acquire the M second display resolutions of the M second electronic devices, or the M second electronic devices may actively transmit the M second display resolutions to the first electronic device.

After acquiring the first display resolution and the M second display resolutions, the first electronic device judges whether the first display resolution is consistent with the M second display resolutions.

In the embodiment of the present disclosure, if it is determined that the first display resolution is consistent with the M second display resolutions, the first electronic device enables the first display content to be displayed on the first display unit and corresponding display content to be displayed on the M second display units respectively.

In the embodiment of the present disclosure, if it is determined that the first display resolution is inconsistent with some of the M second display resolutions, i.e., if it is determined that two of the M second display resolutions are inconsistent with the first display resolution, the various display resolutions firstly need to be adjusted to be consistent.

In an adjustment process, the various display resolutions may be adjusted to a new display resolution, or may be adjusted to be the same as one of these display resolutions.

For example, assume that M=2, the first display resolution is 1, the first second display resolution is 2, and the second second display resolution is 3. Thus, various display resolutions are inconsistent. The first electronic device may adjust the first display resolution, the first second display resolution, and the second second display resolution to 4, i.e., to a new display resolution. Alternatively, the first electronic device may adjust the first display resolution and the first second display resolution to 3, i.e., to a display resolution which is the same as the second second display resolution.

In a specific adjustment process, the first electronic device may transmit an adjustment instruction to a corresponding second electronic device, and the second electronic device may adjust the display resolution of the second display unit of its own after receiving the adjustment instruction.

In short, the specific adjustment manner is not limited in the present disclosure, as long as the display resolutions of various display units are adjusted to be consistent.

After the display resolutions of the various display units are consistent, the first electronic device may control corresponding display units of the various electronic devices to display content needed to be displayed. For example, the first electronic device may control the first display unit to display the first display content.

In the embodiment of the present disclosure, the determination of the size of the display unit and the determination of the display resolution of the display unit may be performed in a random order or simultaneously, which is not limited in the present disclosure.

Further, in the embodiment of the present disclosure, after the first display unit is enabled to display the first display content, i.e., after the third display unit is enabled to display the display content, the first electronic device may acquire an operation of the first display content, and may respond to the operation with the application. Similarly, any of the M second electronic devices may acquire an operation of the first display content, and the M second electronic devices may similarly respond to the operation with the application.

This relates to different problems.

For example, if the application is executed in the first electronic device, the first electronic device may respond to the operation of the first display content by a user with the application when acquiring the operation.

As another example, the application is not executed in the first electronic device, and only the first display content is displayed on the first display unit. In such case, when the first electronic device acquires the operation of the first display content by a user, the first electronic device needs to request, from one or more second electronic devices for executing the application, the corresponding third display content after the second electronic devices respond to the operation with the application. After acquiring the third display content, the first electronic device may continue to display the third display content on the first display area. That is, the first electronic device may substitute the first display content with the third display content, and continues to display the third display content in the first display area. Thus, although the application is not executed in the first electronic device, the user does not feel it at all. The user may operate on any of the first electronic device or the M second electronic devices. No matter whether the application is executed in the electronic device, the user can achieve a desired effect with a response resulting from the application.

Figure 12:
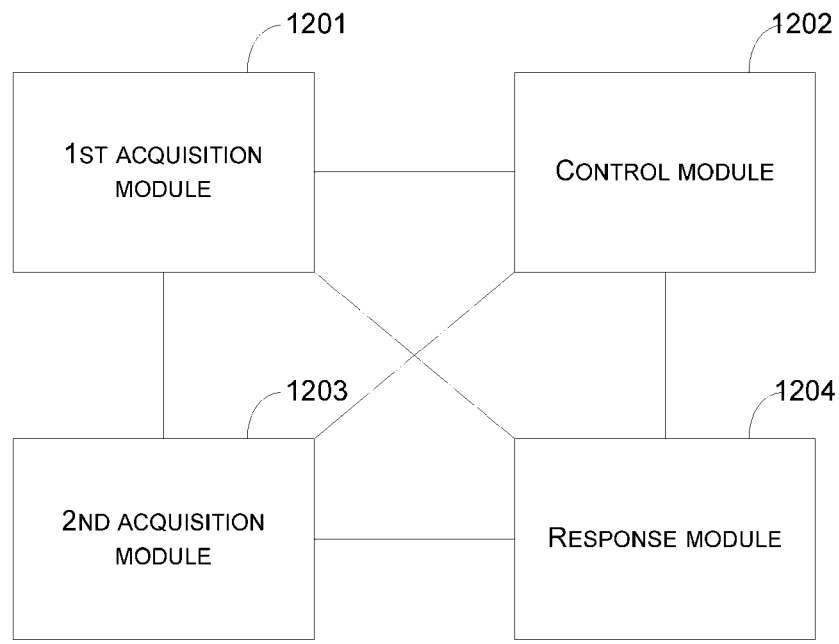
FIG. 12 is a structure schematic diagram of a first electronic device according to an embodiment of the present disclosure.

With reference to FIG. 12, the embodiments of the present disclosure provide an electronic device including a first display unit. The electronic device may be communicated with M second electronic devices. Each of the M second electronic devices includes a second display unit, and therefore, the M second electronic devices totally include M second display units, and the first electronic device is spliced with the M second display units, where M is a positive integer. Preferably, the electronic device according the embodiment illustrated in FIG. 12 is the same as the first electronic device according to the embodiment illustrated in FIG. 11. The electronic device may include an acquisition module 1201 and a control module 1202.

Preferably, the electronic device may further include a second acquisition module 1203 and a response module 1204.

The first acquisition module 1201 may be configured to acquire first display content corresponding to the application when an application is executed in the first electronic device and/or N of M second electronic devices. The first display content is a part of display content corresponding to the application, where N is an integer not larger than M.

The control module 1202 may be configured to enable the first display unit to display the first display content; wherein, the display content is displayed collectively on the first display unit and the M second display units, and each of the first display unit and the M second display units displays a part of the display content.

The first acquisition module 1201 may further be configured to negotiate with the M second electronic devices to acquire the first display content.

The control module 1202 may further be configured to negotiate with the M second electronic devices according to a first size of the first display unit, to determine a first display area on the first display unit; and display the first display content on the first display area.

The control module 1202 may further be configured to negotiate with the M second electronic devices according to a first display resolution of the first display unit, so as to determine whether the first display resolution of the first display unit is consistent with M second display resolutions of the M second display units; and enable the first display unit to display the first display content when the first display resolution is consistent with M second display resolutions.

The first acquisition module 1201 may further be configured to acquire the display content corresponding to the application; and determine the content needed to be displayed on first display unit and the M second display units respectively from the display content, wherein, the first display content needs to be displayed on the first display unit.

The control module 1202 may further be configured to determine a display area according to a first size of the first display unit and M second sizes of the M second display units, the display area being comprised of the first display area of the first display unit and the M second display areas of the M second display units; enable the display content to be displayed in the display area, wherein, the first display content is located in the first display area, and remaining display content in the display content except for the first display content is located in the M second display areas.

The control module 1202 may further be configured to judge whether the first display resolution of the first display unit is consistent with M second display resolutions of the M second display units; and enable the first display unit to display the first display content and the M second display units to display the remaining content in the display content when the first display resolution is consistent with M second display resolutions.

The second acquisition module 1203 may further be configured to acquire an operation of the first display content.

The response module 1204 may further be configured to respond to the operation with the application.

The display method according to the embodiment of the present disclosure may be applied in a first electronic device including a first display unit. The first electronic device may be communicated with M second electronic devices. Each of the M second electronic devices includes a second display unit, and therefore, the M second electronic devices totally include M second display units, and the first display unit is spliced with the M second display units, where M is a positive integer. The method includes: when an application is executed in the first electronic device and/or N of M second electronic devices, acquiring first display content corresponding to the application, the first display content being a part of display content corresponding to the application, where N is an integer not larger than M; enabling the first display unit to display the first display content; wherein, the display content is displayed collectively on the first display unit and the M second display units, and each of the first display unit and the M second display units displays a part of the display content.

In the embodiment of the present disclosure, the display units of the multiple electronic devices may be spliced into one display unit. Thereby, when the application is executed in the electronic device and the display content corresponding to the application needs to be displayed, the display units of the multiple electronic devices may be enabled to collectively display the display content, and each of the display units may display a part of the display content. Thus, the display units of the multiple electronic devices may be spliced into a display unit with a larger size and a larger display image as needed. Obviously, the display effect for many people when they are watching is better, enhancing user experience. At the same time, the multiple electronic devices may also implement respective functions when there is no need to splice them, and therefore do not occupy a space as large as a large-size electronic device, saving space resources.

The embodiments of the present application provide a display method.

Specifically, the method is applied in a first electronic device.

More specifically, the first electronic device may be communicated with a second electronic device.

In the embodiment of the present application, the first electronic device or the second electronic device may be a communication device such as a computer, a mobile phone, a PAD etc. In addition, a type of the first electronic device may be the same as that of the second electronic device. Alternatively, the type of the first electronic device may also be different from that of the second electronic device. The type of the electronic device is not limited by the embodiment of the present application.

In the embodiment of the present application, the display manner is defined for the first electronic device. At this time, the first electronic device may be used as a controlling device, and the second electronic device is used as a controlled device. For ease of differentiation, the electronic devices are numbered.

In addition, a position of the first electronic device relative to the second electronic device will be described.

Firstly, the second electronic device may include N second sub-devices (at this time, the types and sizes of the multiple second sub-devices are not limited in the present application).

Assume that the second electronic device only includes one sub-device. The first electronic device and the second electronic device may be in an up and down arrangement relationship, or in a left and right arrangement relationship.

Assume that the second electronic device includes multiple sub-devices. There may be multiple arrangement relationships between the first electronic device and the multiple second sub-devices, which is not limited in the present application.

Figure 13:
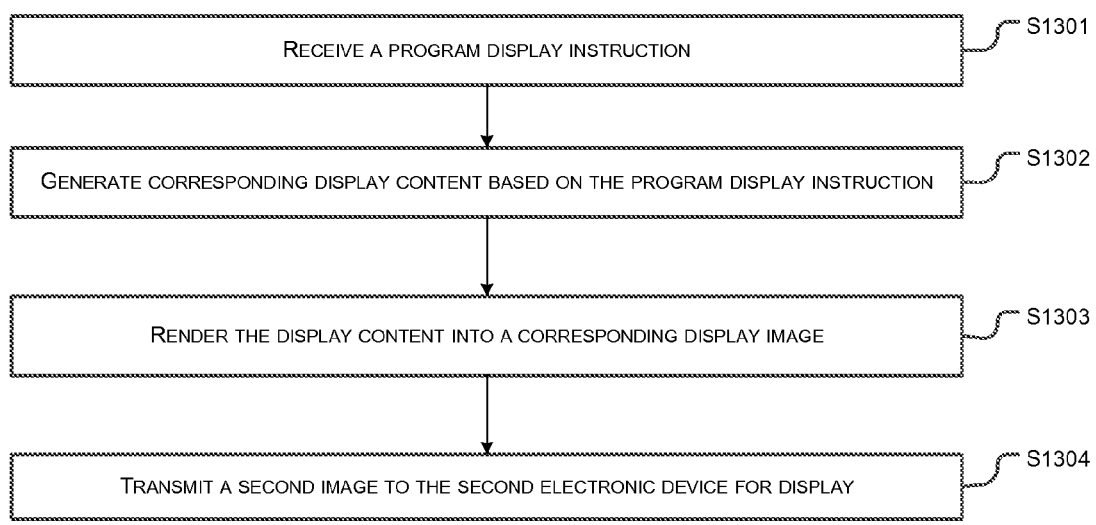
FIG. 13 is a process flow of a display method according to an embodiment of the present disclosure.

With reference to FIG. 13 below, a specific implementation of the display method according to the embodiment of the present application includes:

Step S1301: receiving a program display instruction.

Step S1302: generating corresponding display content based on the program display instruction.

Step S1303: rendering the display content into a corresponding display image.

Step S1304: transmitting a second image to the second electronic device for display.

Specifically, in the implementation of step S1301, the program refers to software capable of being executed in the first electronic device, such as QQ, a webpage, a game, an image software etc. When a certain program needs to be displayed on the first electronic device, the first electronic device will receive a program display instruction for the program.

In the implementation of step S1302, when the program display instruction is received, corresponding display content will be generated based on the instruction.

Taking a WORD document as an example, when a WORD document needs to be displayed on the first electronic device, the first electronic device will receive a program display instruction for opening the WORD document, and then will generate display content of the WORD document based on the instruction.

The display content is comprised of first display sub-content and second display sub-content.

Specifically, the first display sub-content is content to be displayed on the first electronic device.

Taking a WORD document as an example, when a size of a WORD document is maximized for display on the first electronic device, the first electronic device may only display a part of the display content of the WORD document. At this time, the part of the display content displayed on the first electronic device is first display sub-content. The second display sub-content is remaining display content in the WORD document, i.e., content not capable of being displayed on the first electronic device.

In the implementation of step S1303, the display content will further be rendered into a corresponding display image.

Specifically, after the display content is rendered into the display image, a user may view the WORD document on the first electronic device.

The display image is comprised of a first image and a second image. The first image is an image to be displayed on the first electronic device.

At this time, the first image is an image acquired after the first display sub-content is rendered, and is displayed on the first electronic device.

The second image is an image acquired after the second display sub-content is rendered, and is displayed on the second electronic device.

There may be two different manners of rendering the display content into a corresponding display image.

First Manner:

rendering the first display sub-content into the first image and rendering the second display sub-content into the second image simultaneously.

Second Manner:

rendering the first display sub-content into the first image; and after the first display sub-content is rendered into the first image, rendering the second display sub-content into the second image.

In the implementation of step S1304, the second electronic device includes N second sub-devices, where N is an integer larger than or equal to 1.

Therefore, when the second electronic device only includes one second sub-device, the first electronic device will directly transmit the second image to the second electronic device for display.

In a specific implementation, the first electronic device will receive a size of the display area of the second electronic device. Then, the first electronic device adjusts a size of the second image to be consistent with that of the display area of the second electronic device, and transmits the adjusted second image to the second electronic device for display. In addition, the first electronic device may also directly transmit the second image to the second electronic device, and the second electronic device adjusts the second image by itself according to the size of the display area.

When the second electronic device includes multiple second sub-devices, a specific implementation is as follows.

receiving sizes of corresponding display areas from the N second sub-devices.

parsing the second image into N sub-images based on the sizes of the display areas.

transmitting the N sub-images to corresponding N second sub-devices for display.

In conclusion, the above embodiment is a specific implementation of the display method of the present disclosure. Based on the same inventive concept, the following embodiment provides an electronic device.

The embodiment of the present application describes an electronic device. Specifically, the electronic device may be communicated with a second electronic device. At this time, the electronic device in the present application is a controlling device, and the second electronic device is a controlled device. The relative position relationship therebetween has been described in detail in the above embodiment, and detailed description will be omitted here.

Figure 14:
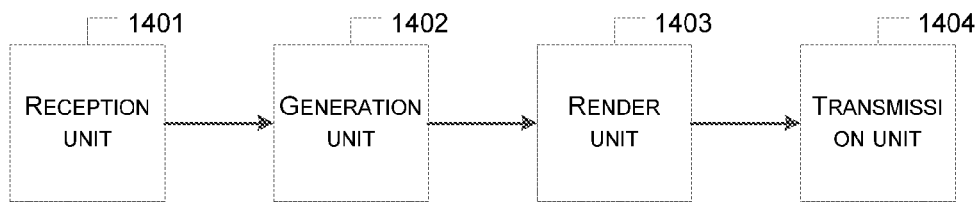
FIG. 14 is a schematic diagram of an electronic device according to an embodiment of the present disclosure.

With reference to FIG. 14 below, the electronic device includes:

a reception unit 1401 configured to receive a program display instruction.

a generation unit 1402 configured to generate corresponding display content based on the program display instruction.

a render unit 1403 configured to render the display content into a corresponding display image, wherein, the display image is comprised of a first image and a second image, and the first image is an image to be displayed on the first electronic device.

a transmission unit 1404 configured to transmit the second image to the second electronic device for display.

Further, the display content is comprised of first display sub-content and second display sub-content.

The render unit 1403 is further configured to render the first display sub-content into the first image and render the second display sub-content into the second image.

Further, the render unit 1403 is further configured to:

render the first display sub-content into the first image; and after rendering the first display sub-content into the first image, render the second display sub-content into the second image.

Further, the second electronic device includes N second sub-devices, where N is an integer larger than or equal to 1.

The transmission unit 1404 further includes:

a reception unit configured to receive sizes of corresponding display areas from the N second sub-devices.

a parse unit configured to parse the second image into N sub-images based on the sizes of the display areas.

a transmission sub-unit configured to transmit the N sub-images to corresponding N second sub-devices for display.

With one or more of the embodiments of the present disclosure, the following technical effects can be achieved:

(1) The embodiments of the present application provide a display method applied in a first electronic device. The specific implementation of the method includes: firstly receiving a program display instruction; secondly generating corresponding display content based on the program display instruction; thirdly rendering the display content into a corresponding display image, wherein, the display image is comprised of a first image and a second image, and the first image is an image to be displayed on the first electronic device; and finally, transmitting the second image to the second electronic device for display. Further, in the technical solutions of the present application, the display content of the same program is rendered into images, wherein, a first image is displayed on the first electronic device, and a second image not capable of being displayed on the first electronic device is transmitted to the second electronic device for display. This can avoid executing the same program in the second electronic device, thus enabling displaying the content of the same program on the two electronic devices without writing codes to control them.

(2) In the embodiment of the present application, the display content is transmitted in a form of image to the second electronic device for display. Therefore, the image not capable of being displayed on the first electronic device can be viewed without executing the same program in the second electronic device. Form the respective of the electronic devices, it can avoid a CPU fault due to many running programs, and ensures usage efficiency and usage life of the electronic devices. From the respective of the user, the user can utilize two or more electronic devices to synchronously execute the same program. In addition, in order to display the content of the program in a form of image on another electronic device, the user only needs to operate on the first electronic device, then the content of the program not displayed on the first electronic device can be viewed in advance, without adjusting the two electronic devices simultaneously to ensure consistence of data, largely enhancing user experience.

The embodiment of the present application provides an image display method.

Further, the method is applied in a first electronic device.

The first electronic device may be communicated with a second electronic device, and includes a display unit in a first display size.

In the embodiment of the present application, the first electronic device or the second electronic device may be a communication device such as a computer, a mobile phone, a PAD etc. In addition, a type of the first electronic device may be the same as that of the second electronic device. Alternatively, the type of the first electronic device may also be different from that of the second electronic device. The type of the electronic device is not limited by the embodiment of the present application.

In the embodiment of the present application, the display manner is defined for the first electronic device. At this time, the first electronic device may be used as a controlling device, and the second electronic device is used as a controlled device. For ease of differentiation, the electronic devices are numbered (i.e., distinguishing them with "first" and "second").

In addition, a position of the first electronic device relative to the second electronic device will be described.

Firstly, the second electronic device may include N second sub-devices (at this time, the types and sizes of the multiple second sub-devices are not limited in the present application).

Assume that the second electronic device only includes one sub-device. The first electronic device and the second electronic device may be in an up and down arrangement relationship, or in a left and right arrangement relationship.

Assume that the second electronic device includes multiple second sub-devices. There may be multiple arrangement relationships between the first electronic device and the multiple second electronic devices, which is not limited in the present application.

In addition, the first electronic device and the second electronic devices have respective display sizes.

A display size of the first electronic device corresponds to a first display size.

A display size of the second electronic device corresponds to a second display size. When the second electronic device includes multiple second sub-devices, the sub-devices have respective display sizes, and the second display size is general terms of the display sizes of the multiple second sub-devices.

Figure 15:
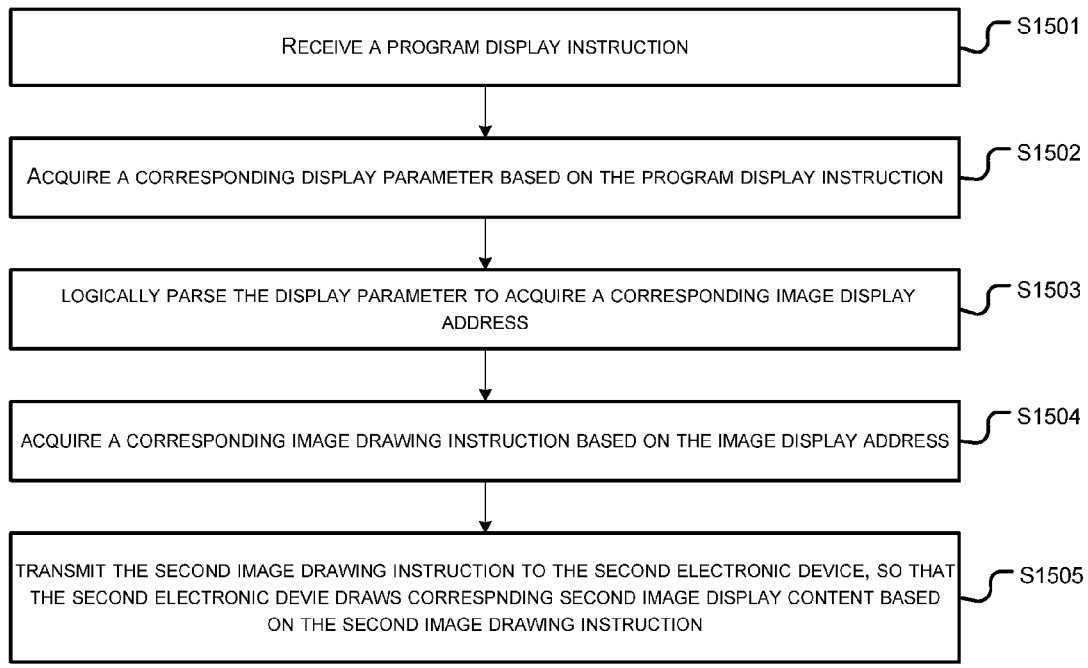
FIG. 15 is a process flow of an image display method according to an embodiment of the present disclosure.

With reference to FIG. 15 below, a specific implementation of the method according to the embodiment of the present application includes:

Step S1501: receiving a program display instruction.

Step S1502: acquiring a corresponding display parameter based on the program display instruction.

Step S1503: logically parsing the display parameter to acquire a corresponding image display address.

Step S1504: acquiring a corresponding image drawing instruction based on the image display address.

Step S1505: transmitting the second image drawing instruction to the second electronic device, so that the second electronic device draws corresponding second image display content based on the second image drawing instruction.

In the implementation of step S1501, the program refers to software capable of being executed in the first electronic device, such as QQ, a webpage, a game, an image software etc. When a certain program needs to be displayed on the first electronic device, the first electronic device will receive a program display instruction for the program. Taking a WORD document as an example, when a WORD document needs to be displayed on the first electronic device, the first electronic device will receive a program display instruction for opening the WORD document.

In the implementation of step S1502, the display parameter specifically refers to a parameter of a certain program needed to be displayed on the display unit of the electronic device. The display parameter is comprised of image display content and an image display address.

Taking an image as an example, the display parameter may specifically refer to RGB of a chrominance channel in the image, a gray value of a brightness channel, and a logic address of a display unit corresponding to the image etc.

Before the implementation of step S1503, a second display size will be acquired from the second electronic device. When the second electronic device includes multiple second sub-devices, various sub-devices have respective display sizes, and the second display size is general terms of the display sizes of the multiple second sub-devices.

In the implementation of step S1503, since the display parameter is comprised of image display content and an image display address, the display parameter will be processed as follows after it is acquired:

logically parsing the display parameter to acquire a corresponding image display address by:

logically parsing the display parameter based on the first display size and the second display size, to acquire a first display address corresponding to the first display size and a second display address corresponding to the second display size respectively.

In a specific implementation, the purpose of combining the first display size and the second display size together to logically parse the display parameter is to display content of the same program on multiple different electronic devices by taking the first electronic device as a controlling device, each electronic device displaying a part of the program. This avoids writing codes of multiple electronic devices for control.

More specifically, when the display parameter is logically parsed, assume that the first display size is 1280*1280, and the second electronic device includes 3 second sub-devices, each having a display size of 1280*1280.

Therefore, a display proportion of the four electronic devices is firstly calculated to be 1:1:1:1.

Then, the display parameter is logically parsed. During this time, the display parameter may be parsed with reference to the display proportion of the four electronic devices, so as to calculate a logical address of each electronic device in the display parameter.

In the implementation of step S1504, the image drawing instruction includes a first image drawing instruction and a second image drawing instruction.

The first image drawing instruction is used to draw first image display content corresponding to the first display size on the first electronic device.

The specific manner of acquiring the image drawing instruction is as follows:

parsing the image display content based on the first display address and the second display address, to acquire the first image drawing instruction and the second image drawing instruction.

Specifically, the display address corresponds to the image display content which is comprised of the first image display content and the second image display content. Therefore, the first display address corresponds to the first image display content, and the second display address corresponds to the second image display content.

More specifically, a corresponding image drawing instruction may be acquired based on the image display content. The image drawing instruction includes display content of the image. The first image drawing instruction corresponds to the first image display content, and the second image drawing instruction corresponds to the second image display content. In addition, the image drawing instruction also corresponds to the display address.

Therefore, after the first electronic device receives the first image drawing instruction, it will acquire the first image display content and the first display address according to the instruction, and then display the first image display content according to the corresponding first display address, to acquire a final display result.

The first electronic device will perform step S1505 for the second electronic device.

In the implementation of step S1505, the second electronic device may include only one sub-device or multiple sub-devices. When the second electronic device only includes one sub-device, the first electronic device will directly transmit the second image drawing instruction to the second electronic device, and then the second electronic device will draw corresponding second image display content based on the second image drawing instruction.

When the second electronic device includes N second sub-devices, where N is an integer larger than or equal to 1, the second image drawing instruction also include N second image drawing instructions.

At this time, transmitting the second image drawing instruction to the second electronic device further includes:

transmitting the N second image drawing instructions to corresponding N second sub-devices.

After the N second sub-devices receive the corresponding second image drawing instructions, each of the N second sub-devices displays corresponding second image display sub-content.

In conclusion, the above embodiment is a specific implementation of the display method of the present disclosure. Based on the same inventive concept, the following embodiment provides an electronic device.

The embodiment of the present application describes an electronic device.

Specifically, the electronic device may be communicated with a second electronic device and includes a display unit in a first display size.

At this time, the electronic device in the present application is a controlling device, and the second electronic device is a controlled device. The relative position relationship therebetween has been described in detail in the above embodiment illustrated in FIG. 15, and detailed description will be omitted here.

Figure 16:
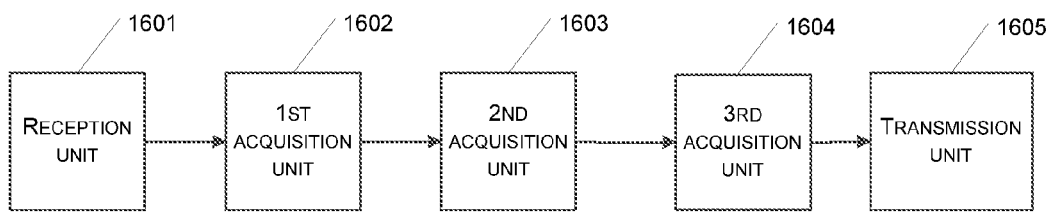
FIG. 16 is a schematic diagram of an electronic device according to an embodiment of the present disclosure.

With reference to FIG. 16 below, the electronic device includes:

a reception unit 1601 configured to receive a program display instruction.

a first acquisition unit 1602 configured to acquire a corresponding display parameter based on the program display instruction.

a second acquisition unit 1603 configured to logically parse the display parameter to acquire a corresponding image display address.

a third acquisition unit 1604 configured to acquire a corresponding image drawing instruction based on the image display address, wherein, the image drawing instruction includes a first image drawing instruction and a second image drawing instruction, and the first image drawing instruction is used to draw first image display content corresponding to the first display size on the first electronic device.

a transmission unit 1605 configured to transmit the second image drawing instruction to the second electronic device, so that the second electronic device draws corresponding second image display content based on the second image drawing instruction.

The electronic device further includes:

a fourth acquisition unit configured to logically parse the display parameter to acquire a second display size from the second electronic device before the corresponding image display address is acquired.

Further, the display parameter is comprised of image display content and an image display address.

The second acquisition unit 1603 is further configured to logically parse the display parameter based on the first display size and the second display size, to acquire a first display address corresponding to the first display size and a second display address corresponding to the second display size respectively.

Further, the third acquisition unit 1604 is further configured to parse the image display content based on the first display address and the second display address, to acquire the first image drawing instruction and the second image drawing instruction.

The image display content is comprised of the first image display content and the second image display content. The first image drawing instruction corresponds to the first image display content, and the second image drawing instruction corresponds to the second image display content.

Further, the second electronic device includes N second sub-devices, and the second image drawing instruction includes N second image drawing instructions, where N is an integer larger than or equal to 1.

The transmission unit 1605 is further configured to transmit the N second image drawing instructions to corresponding N second sub-devices, to enable each of the N second sub-devices to display corresponding second image display sub-content.

With one or more of the embodiments of the present disclosure, the following technical effects can be achieved:

(1) The embodiments of the present application provide a display method applied in a first electronic device. The specific implementation of the method includes: receiving a program display instruction; acquiring a corresponding display parameter based on the program display instruction; logically parsing the display parameter to acquire a corresponding image display address; acquiring a corresponding image drawing instruction based on the image display address, wherein, the image drawing instruction includes a first image drawing instruction and a second image drawing instruction, and the first image drawing instruction is used to draw first image display content corresponding to the first display size on the first electronic device; and transmitting the second image drawing instruction to the second electronic device, so that the second electronic device draws corresponding second image display content based on the second image drawing instruction. Further, in the technical solutions of the present application, the display parameter of the same program is logically parsed to acquire a corresponding display address, and an image drawing instruction is further generated and a corresponding image drawing instruction is transmitted to another electronic device, so that second image display content not capable of being displayed on the first electronic device is transmitted to the second electronic device for display. This can avoid executing the same program in the second electronic device and the first electronic device, achieving displaying the content of the same program on multiple electronic devices without writing codes to control them.

(2) In the embodiment of the present application, the display content is transmitted in a form of image to the second electronic device for display. Therefore, the image not capable of being displayed on the first electronic device can be viewed without executing the same program in the second electronic device. Form the respective of the electronic devices, it can avoid a CPU fault due to many running programs, and ensures usage efficiency and usage life of the electronic devices. From the respective of the user, the user can utilize two or more electronic devices to synchronously execute the same program. In addition, in order to display the content of the program in a form of image on another electronic device, the user only needs to operate on the first electronic device, then the content of the program not displayed on the first electronic device can be viewed in advance, without adjusting the two electronic devices simultaneously to ensure consistence of data, largely enhancing user experience.

The disclosure is described with reference to the flowcharts and/or block diagrams of the methods, devices (systems) and computer program products according to the embodiments of the disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed in the computer or other programmable devices provide a step of implementing functions specified in one or more flows in the flowcharts and/or one or more blocks in the block diagrams.

What is claimed is:

1. An information processing method applied in a first electronic device of multiple electronic devices, the first electronic device comprising a first display unit and being capable of communicating with a second electronic device comprising a second display unit of the multiple electronic devices, the method comprising:
acquiring data of a first part of a first object needed to be displayed on the first display unit, wherein, data of a second part in the first object different from the data of the first part is determined to be displayed on the second display unit;
synchronizing, by the first electronic device, with the second electronic device; and
displaying the data of the first part on the first display unit by the first electronic device synchronously executing a first application program corresponding to the first object while displaying the data of the second part on the second display unit by the second electronic device executing the first application program;
wherein, the distances among the multiple electronic devices are smaller than a preset threshold, the method further comprising:
when a control instruction is received, converting the control instruction into an instruction sequence comprising multiple decomposition instructions according to attribute parameters of the multiple electronic devices; and
transmitting the multiple decomposition instructions to corresponding electronic devices respectively according to correspondence relationships between the decomposition instructions in the instruction sequence and the multiple electronic devices, so as to control operations of the multiple electronic devices.

2. The method of claim 1, wherein, said acquiring data of a first part of a first object needed to be displayed on the first display unit further comprises:
receiving to acquire the data of the first part needed to be displayed on the first display unit which is determined by a third electronic device;
wherein, the third electronic device is different from both the first electronic device and the second electronic device, and is further configured to determine the data of the second part needed to be displayed on the second display unit.

3. The method of claim 1, wherein, said synchronizing, by the first electronic device, with the second electronic device further comprises:
establishing a communication connection between the first electronic device and the second electronic device; and
synchronizing the first electronic device with the second electronic device through a first timeline module in the first electronic device and a second timeline module in the second electronic device.

4. The method of claim 3, wherein, said displaying the data of the first part on the first display unit by the first electronic device synchronously executing the first application program further comprises:
receiving, by a first graphics processor in the first electronic device, the data of the first part from a central processing unit in the first electronic device when the first application program is running;
processing, by the graphics processor, the data of the first part to acquire first output content;
storing the first output content in a first display memory of the first electronic device; and
performing, by a first random read-write storage digital-to-analog converter in the first electronic device, digital-to-analog conversion on the first output content to acquire first analog content corresponding to the first output content, and transmitting the first analog content to the first display unit for display.

5. The method of claim 4, wherein, when the whole display area corresponding to the first display unit can only display the data of the first part in the first object, the data of the second part is data not capable of being displayed on the first display unit in the first object except for the data of the first part; or
when the whole display area corresponding to the first display unit can completely display the first object, the data of the second part is display data corresponding to a second display area in the whole display area when the first object is completely displayed on the first display unit.

6. The method of claim 1, wherein, when the control instruction is a first control instruction for controlling the execution of the first application program, said converting the control instruction into an instruction sequence comprising multiple decomposition instructions according to attribute parameters of the multiple electronic devices further comprises:
determining a first electronic device configured with the first application program based on the attribute parameters of the multiple electronic devices;
determining a second electronic device of which a display parameter meets a first preset condition based on the attribute parameters of the multiple electronic devices, the first electronic device being different from the second electronic device;
encapsulating a correspondence relationship between an execution instruction for the first application program and the first electronic device into a first decomposition instruction, and encapsulating a correspondence relationship between a display and output instruction after the first application program is executed and the second electronic device into a second decomposition instruction; and
combining the first decomposition instruction and the second decomposition instruction into the instruction sequence.

7. The method of claim 6, wherein, said determining a first electronic device configured with the first application program based on the attribute parameters of the multiple electronic devices further comprises:
when there are multiple first electronic devices, acquiring hardware attribute parameters of the multiple first electronic devices; and comparing the hardware attribute parameters of the various first electronic devices, and determining one of the multiple first electronic devices to execute the first application program based on a comparison result.

8. The method of claim 6, wherein, said encapsulating a correspondence relationship between a display and output instruction after the first application program is executed and the second electronic device into a second decomposition instruction further comprises:
when there are multiple second electronic devices, determining, by position means, relative positions of the multiple second electronic devices;
dividing display content after the first application program is executed into multiple display content blocks according to a number of the second electronic devices;
determining a correspondence relationship between various second electronic devices and various display content blocks according to the relative positions of the multiple second electronic devices; and
encapsulating the correspondence relationship between various second electronic devices and the display content blocks into the second decomposition instruction.

9. The method of claim 1, wherein, the first electronic device is capable of communicating with M second electronic devices, each of the M second electronic devices comprises a second display unit, the M second electronic devices totally comprise M second display units, and the first display unit is spliced with the M second display units, where M is a positive integer, the method further comprising:
when an application is executed in the first electronic device and/or N of the M second electronic devices, acquiring first display content corresponding to the application, the first display content being a part of display content corresponding to the application, where N is an integer not larger than M; and
enabling the first display unit to display the first display content, wherein, the display content is displayed collectively on the first display unit and the M second display units, and each of the first display unit and the M second display units displays a part of the display content.

10. The method of claim 9, wherein, said enabling the first display unit to display the first display content further comprises:
negotiating with the M second electronic devices according to a first display resolution of the first display unit, so as to determine whether the first display resolution of the first display unit is consistent with M second display resolutions of the M second display units; and
when the first display resolution is consistent with the M second display resolutions, enabling the first display unit to display the first display content.

11. The method of claim 9, wherein, said enabling the first display unit to display the first display content further comprises:
determining a display area according to a first size of the first display unit and M second sizes of the M second display units, the display area being comprised of the first display area of the first display unit and the M second display areas of the M second display units; and
enabling the display content to be displayed in the display area, wherein, the first display content is located in the first display area, and remaining display content except for the first display content is located in the M second display areas.

12. The method of claim 9, wherein, said enabling the first display unit to display the first display content further comprises:
judging whether the first display resolution of the first display unit is consistent with M second display resolutions of the M second display units; and
when the first display resolution of the first display unit is consistent with the M second display resolutions, enabling the first display unit to display the first display content and enabling the M second display units to display the remaining display content in the display content.

13. The method of claim 1, further comprising:
receiving a program display instruction;
generating corresponding display content according to the program display instruction;
rendering the display content into a corresponding display image, wherein, the display image is comprised of a first image and a second image, and the first image is an image to be displayed on the first electronic device; and
transmitting the second image to the second electronic device for display.

14. The method of claim 1, wherein, the display unit of the first electronic device is in a first display size, the method further comprising:
receiving a program display instruction;
acquiring a corresponding display parameter based on the program display instruction;
logically parsing the display parameter to acquire a corresponding image display address;
acquiring a corresponding image drawing instruction based on the image display address, wherein, the image drawing instruction comprises a first image drawing instruction and a second image drawing instruction, and the first image drawing instruction is used to draw first image display content corresponding to the first display size on the first electronic device; and
transmitting the second image drawing instruction to the second electronic device, so that the second electronic device draws corresponding second image display content based on the second image drawing instruction.

15. The method of claim 14, wherein, the display parameter is comprised of the image display content and the image display address;
said logically parsing the display parameter to acquire a corresponding image display address further comprises:
logically parsing the display parameter based on the first display size and the second display size, to acquire a first display address corresponding to the first display size and a second display address corresponding to the second display size respectively.

16. The method of claim 14, wherein, said acquiring a corresponding image drawing instruction based on the image display address further comprises:
parsing the image display content based on the first display address and the second display address, to acquire the first image drawing instruction and the second image drawing instruction;
wherein, the image display content is comprised of the first image display content and the second image display content, the first image drawing instruction corresponds to the first image display content, and the second image drawing instruction corresponds to the second image display content.

17. The method of claim 14, wherein, the second electronic device comprises N second sub-devices, and the second image drawing instruction comprise N second image drawing instructions, where N is an integer larger than or equal to 1;

said transmitting the second image drawing instruction to the second electronic device further comprises:

transmitting the N second image drawing instructions to corresponding N second sub-devices, so that each of the N second sub-devices displays corresponding second image display sub-content.

18. A first electronic device comprising a first display unit and being capable of communicating with a second electronic device comprising a second display unit, the first electronic device further comprising:

a first acquisition unit configured to acquire data of a first part of a first object needed to be displayed on the first display unit, wherein, data of a second part in the first object different from the data of the first part is determined to be displayed on the second display unit;

a first synchronization unit configured to synchronize the first electronic device with the second electronic device; and a first execution unit configured to display the data of the first part on the first display unit by the first electronic device synchronously executing the first application program corresponding to the first object while displaying the data of the second part on the second display unit by the second electronic device executing the first application program;

wherein, distances among the multiple electronic devices are smaller than a preset threshold, the first electronic device further comprising:

an instruction sequence generation unit configured to, when a control instruction is received, convert to control instruction into an instruction sequence comprising multiple decomposition instructions according to attribute parameters of the multiple electronic devices; and a control unit configured to transmit the multiple decomposition instructions to corresponding electronic devices respectively according to correspondence relationships between the decomposition instructions in the instruction sequence and the multiple electronic devices, so as to control operations of the multiple electronic devices.

19. The first electronic device of claim 18, wherein, the first acquisition unit further comprises:

a first establishment module configured to establish a communication connection between the first electronic device and the second electronic device; and a first negotiation module configured to enable the first electronic device to negotiate with the second electronic device, so as to determine the data of the first part to be displayed on the first display unit.

20. The first electronic device of claim 18, wherein, the first acquisition unit further comprises:

a first reception unit configured to receive to acquire the data of the first part needed to be displayed on the first display unit which is determined by the third electronic device;

wherein, the third electronic device is different from both the first electronic device and the second electronic device, and is further configured to determine the data of the second part needed to be displayed on the second display unit.

21. The first electronic device of claim 18, wherein, the first synchronization unit further comprises:

a second establishment module configured to establish a communication channel between the first electronic device and the second electronic device; and a first synchronization module configured to synchronize the first electronic device with the second electronic device through a first timeline module in the first electronic device and a second timeline module in the second electronic device.

22. The first electronic device of claim 21, wherein, when the whole display area corresponding to the first display unit can only display the data of the first part in the first object, the data of the second part is data not capable of being displayed on the first display unit in the first object except for the data of the first part; or when the whole display area corresponding to the first display unit can completely display the first object, the data of the second part is display data corresponding to a second display area in the whole display area when the first object is completely displayed on the first display unit.

23. The first electronic device of claim 21, wherein, the first application program is an application program with a corresponding time synchronization value representing the degree of time synchronization being smaller than a preset synchronization value.

* * * * *